US010263462B2

(12) United States Patent
Fife

(10) Patent No.: US 10,263,462 B2
(45) Date of Patent: Apr. 16, 2019

(54) ELECTRICAL SYSTEM CONTROL USING SIMULATION-BASED SETPOINT DETERMINATION, AND RELATED SYSTEMS, APPARATUSES, AND METHODS

(71) Applicant: Demand Energy Networks, Inc., Liberty Lake, WA (US)

(72) Inventor: John Michael Fife, Bend, OR (US)

(73) Assignee: Demand Energy Networks, Inc., Liberty Lake, WA (US)

(*) Notice: Subject to any disclaimer, the term of this patent is extended or adjusted under 35 U.S.C. 154(b) by 125 days.

(21) Appl. No.: 15/498,297

(22) Filed: Apr. 26, 2017

(65) Prior Publication Data

US 2017/0317528 A1 Nov. 2, 2017

Related U.S. Application Data

(60) Provisional application No. 62/328,476, filed on Apr. 27, 2016.

(51) Int. Cl.
| | | |
|---|---|---|
| H02J 13/00 | (2006.01) | |
| G05B 13/04 | (2006.01) | |
| H02J 3/00 | (2006.01) | |
| H02J 7/00 | (2006.01) | |

(52) U.S. Cl.
CPC ........ *H02J 13/0006* (2013.01); *G05B 13/048* (2013.01); *H02J 3/00* (2013.01); *H02J 7/00* (2013.01); *H02J 2003/003* (2013.01); *H02J 2003/007* (2013.01); *Y02E 60/76* (2013.01); *Y04S 40/22* (2013.01)

(58) Field of Classification Search
CPC .... H02J 13/0006; H02J 3/00; H02J 2003/003; H02J 2003/007; G05B 13/048
See application file for complete search history.

(56) References Cited

U.S. PATENT DOCUMENTS

| | | | |
|---|---|---|---|
| 8,886,361 B1* | 11/2014 | Harmon | G06Q 10/04 700/291 |
| 9,020,800 B2 | 4/2015 | Shelton et al. | |
| 9,436,179 B1* | 9/2016 | Turney | G05B 23/02 |
| 9,865,024 B2 | 1/2018 | Mokhtari et al. | |
| 2009/0319090 A1* | 12/2009 | Dillon | G06Q 10/04 700/291 |
| 2010/0198421 A1* | 8/2010 | Fahimi | H02J 3/32 700/291 |
| 2011/0071695 A1 | 3/2011 | Kouroussis et al. | |
| 2012/0296482 A1* | 11/2012 | Steven | G06Q 50/06 700/291 |
| 2012/0319642 A1* | 12/2012 | Suyama | H02J 3/32 320/101 |

(Continued)

*Primary Examiner* — Christopher E. Everett
(74) *Attorney, Agent, or Firm* — Stoel Rives LLP; R. Whitney Johnson

(57) ABSTRACT

The present disclosure is directed to systems and methods for controlling an electrical system using simulation-based setpoints. Some embodiments include control methods that enable recalculation of the optimal setpoints during demand windows. Some embodiments include a multi-mode controller to control an electrical system in a charge mode and a demand mode. Some embodiments include techniques for load and generation learning and prediction. Some embodiments include consideration of external data, such as weather.

30 Claims, 23 Drawing Sheets

(56) References Cited

U.S. PATENT DOCUMENTS

| | | | |
|---|---|---|---|
| 2012/0323389 A1* | 12/2012 | Shelton | G06Q 50/06 700/295 |
| 2013/0013121 A1 | 1/2013 | Henze et al. | |
| 2013/0030590 A1* | 1/2013 | Prosser | H02J 3/14 700/295 |
| 2013/0079939 A1 | 3/2013 | Darden, II et al. | |
| 2013/0166081 A1* | 6/2013 | Sanders | G05B 11/01 700/286 |
| 2013/0166084 A1* | 6/2013 | Sedighy | G06Q 50/06 700/291 |
| 2013/0226358 A1 | 8/2013 | Rudkevich et al. | |
| 2013/0261817 A1* | 10/2013 | Detmers | H02J 3/382 700/287 |
| 2013/0261823 A1* | 10/2013 | Krok | G05F 5/00 700/291 |
| 2013/0274935 A1* | 10/2013 | Deshpande | H02J 3/28 700/291 |
| 2013/0346139 A1* | 12/2013 | Steven | G06Q 10/00 705/7.24 |
| 2014/0039965 A1* | 2/2014 | Steven | G06Q 10/06315 705/7.25 |
| 2014/0058572 A1* | 2/2014 | Stein | G06Q 50/06 700/291 |
| 2014/0236369 A1* | 8/2014 | Kearns | H02J 3/00 700/291 |
| 2014/0266054 A1* | 9/2014 | Faries | H02J 3/32 320/128 |
| 2014/0277797 A1* | 9/2014 | Mokhtari | G06Q 30/0202 700/291 |
| 2014/0350743 A1* | 11/2014 | Asghari | G05B 13/048 700/297 |
| 2015/0127425 A1 | 5/2015 | Greene et al. | |
| 2016/0041575 A1* | 2/2016 | Tadano | G06Q 10/04 700/291 |
| 2017/0099056 A1* | 4/2017 | Vickery | G05B 13/0255 |

* cited by examiner

ELECTRICAL SYSTEM CONTROL USING SIMULATION-BASED SETPOINT DETERMINATION, AND RELATED SYSTEMS, APPARATUSES, AND METHODS

RELATED APPLICATIONS

This application claims priority to U.S. Provisional Patent Application No. 62/328,476, titled "Demand Charge Reduction using Simulation-Based Demand Setpoint Determination," filed Apr. 27, 2016. The subject matter of the foregoing application is hereby incorporated herein by reference to the extent such subject matter is not inconsistent herewith.

TECHNICAL FIELD

The present disclosure is directed to systems and methods for control of an electrical system, and more particularly to controllers and methods of controllers for controlling an electrical system.

BACKGROUND

Electricity supply and delivery costs continue to rise, especially in remote or congested areas. Moreover, load centers (e.g., population centers where electricity is consumed) increasingly demand more electricity. In the U.S. energy infrastructure is such that power is mostly produced by resources inland, and consumption of power is increasing at load centers along the coasts. Thus, transmission and distribution (T&D) systems are needed to move the power from where it's generated to where it's consumed at the load centers. As the load centers demand more electricity, additional T&D systems are needed, particularly to satisfy peak demand. However, a major reason construction of additional T&D systems is unwise and/or undesirable is because full utilization of this infrastructure is really only necessary during relatively few peak demand periods, and would otherwise be unutilized or underutilized. Justifying the significant costs of constructing additional T&D resources may make little sense when actual utilization may be relatively infrequent.

Distributed energy storage is increasingly seen as a viable means for minimizing rising costs by storing electricity at the load centers for use during the peak demand times. An energy storage system (ESS) can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high.

An automatic controller may be beneficial to reduce costs of operation of an electrical system during peak demand times.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

Figure 1:
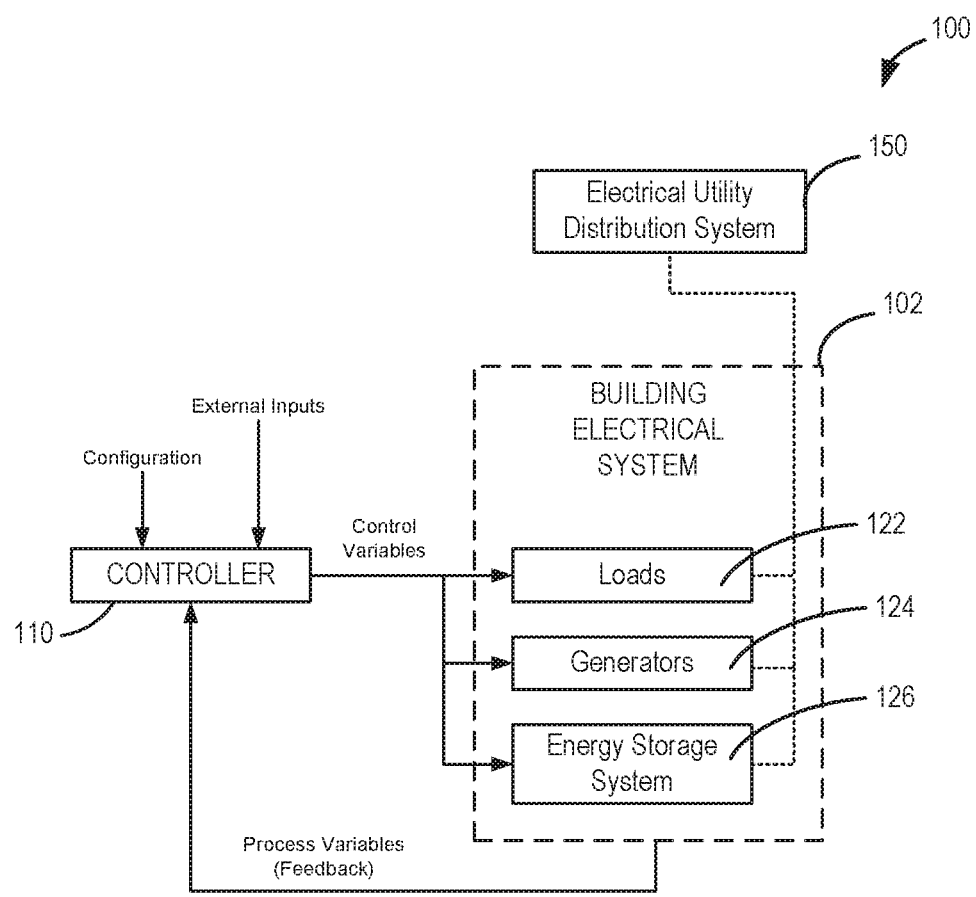
FIG. 1 is a block diagram illustrating a system architecture of a controllable electrical system, according to one embodiment of the present disclosure.

As electricity supply and delivery costs increase, especially in remote or congested areas, distributed energy storage is increasingly seen as a viable means for reducing those costs. The reasons are numerous, but primarily an energy storage system (ESS) gives a local generator or consumer the ability to control net consumption and delivery of electrical energy at a point of interconnection, such as a building's service entrance in example implementations where an ESS is utilized in an apartment building or office building. For example, if electricity supply and/or delivery costs (e.g., charges) are high at a particular time of day, an ESS can generate/discharge electrical energy from a storage system at that time to reduce the net consumption of a consumer (e.g., a building), and thus reduce costs to the consumer. Likewise, when electricity rates are low, the ESS may charge its storage system which may include one or more batteries or other storage devices; the lower-cost energy stored in the ESS can then be used to reduce net consumption and thus costs to the consumer at times when the supply and/or delivery costs are high. There are many ways an ESS can provide value.

One possible way in which ESSs can provide value is by reducing demand charges. Demand charges are electric utility charges that are based on the rate of electrical energy consumption (also called "demand") during particular time windows (which we will call "demand windows"). A precise definition of demand and the formula for demand charges may be defined in a utility's tariff document. For example, a tariff may specify that demand be calculated at given demand intervals (e.g., 15-minute intervals, 30-minute intervals, 40-minute intervals, 60-minute intervals, 120-minute intervals, etc.). The tariff may also define demand as being the average rate of electrical energy consumption over a previous period of time (e.g., the previous 15 minutes, 30 minutes, 40 minutes, etc.). The previous period of time may or may not coincide with the demand interval. Demand may be expressed in units of power such as kilowatts (kW) or megawatts (MW). The tariff may describe one or more demand rates, each with an associated demand window (e.g., a period of time during which a demand rate applies). The demand windows may be contiguous or noncontiguous and may span days, months, or any other total time interval per the tariff. Also, one or more demand window may overlap which means that, at a given time, more than one demand rate may be applicable. Demand charges for each demand window may be calculated as a demand rate multiplied by the maximum demand during the associated demand window. Demand rates in the United States may be expressed in dollars per peak demand ($/kW). An example of demand charges is shown in FIG. 24 and described more fully below with reference to the same. As can be appreciated, demand tariffs may change from time to time, or otherwise vary, for example annually, seasonally, monthly, or daily. An automatic controller may be beneficial and may be desirable to enable intelligent actions to be taken as frequently as may be needed to utilize an ESS to reduce demand charges.

As can be appreciated, an automatic controller that can automatically operate an electrical system to reduce demand charges using an ESS may be desirable and beneficial.

Controlling Electrical Systems

An electrical system, according to some embodiments, may include one or more electrical loads, generators, and ESSs. An electrical system may include all three of these components (loads, generators, ESSs), or may have varying numbers and combinations of these components. For example, an electrical system may have loads and an ESS, but no local generators (e.g., photovoltaic, wind). The electrical system may or may not be connected to an electrical utility distribution system (or "grid"). If not connected to an electrical utility distribution system, it may be termed "off-grid."

An ESS of an electrical system may include one or more storage devices and any number of power conversion devices. The power conversion devices are able to transfer energy between an energy storage device and the main electrical power connections that in turn connect to the electrical system loads and, in some embodiments, to the grid. The energy storage devices may be different in different implementations of the ESS. A battery is a familiar example of a chemical energy storage device. For example, in one embodiment of the present disclosure, one or more electric vehicle batteries is connected to an electrical system and can be used to store energy for later use by the electrical system. A flywheel is an example of a mechanical energy storage device.

FIG. 1 is a control diagram of an electrical system 100, according to one embodiment of the present disclosure. Stated otherwise, FIG. 1 is a representative diagram of a system architecture of an electrical system 100 including a controller 110, according to one embodiment. The electrical system 100 comprises a building electrical system 102 that is controlled by the controller 110. The building electrical system 102 includes one or more loads 122, one or more generators 124, and an energy storage system (ESS) 126. The building electrical system 102 is coupled to an electrical utility distribution system 150, and therefore may be considered on-grid. Similar electrical systems exist for other applications such as a photovoltaic generator plant and an off-grid building.

In the control diagram of FIG. 1, the controller 110 is shown on the left-hand side and the building electrical system 102, sometimes called the "plant," is on the right-hand side. The controller 110 may include electronic hardware and software in one embodiment. In one example arrangement, the controller 110 includes one or more processors and suitable storage media, which stores programming in the form of executable instructions which are executed by the processors to implement the control processes. In some embodiments, the building electrical system 102 is the combination of all local loads 122, local generators 124, and the ESS 126.

Loads are consumers of electrical energy within an electrical system. Examples of loads are air conditioning systems, motors, electric heaters, etc. The sum of the loads' electricity consumption rates can be measured in units of power (e.g. kW) and simply called "load" (e.g., a building load).

Generators may be devices, apparatuses, or other means for generating electrical energy within an electrical system. Examples are solar photovoltaic systems, wind generators, combined heat and power (CHP) systems, and diesel generators or "gen-sets." The sum of electric energy generation rates of the generators 124 can be measured in units of power (e.g., kW) and simply referred to as "generation."

As can be appreciated, loads may also generate at certain times. An example may be an elevator system that is capable of regenerative operation when the carriage travels down.

Unadjusted net power may refer herein to load minus generation in the absence of active control by a controller described herein. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation, and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is demand defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 1, the building electrical system 102 may provide information to the controller 110, such as in a form of providing process variables. The process variables may provide information, or feedback, as to a status of the building electrical system 102 and/or one or more components (e.g., loads, generators, ESSs) therein. For example, the process variable may provide one or more measurements of a state of the electrical system. The controller 110 receives the process variables for determining values for control variables to be communicated to the building electrical system 102 to effectuate a change to the building electrical system 102 toward meeting a controller objective for the building electrical system 102. For example, the controller 110 may provide a control variable to adjust the load 122, to increase or decrease generation by the generator 124, and to utilize (e.g., charge or discharge) the ESS 126. The controller 110 may also receive a configuration (e.g., a set of configuration elements), which may specify one or more constraints of the electrical system 102. The controller 110 may also receive external inputs (e.g., weather reports, changing tariffs, fuel costs, event data), which may inform the determination of the values of the control variables. A set of external inputs may be received by the controller 110. The set of external inputs may provide indication of one or more conditions that are external to the controller and the electrical system.

As noted, the controller 110 may attempt to meet certain objectives by changing a value associated with one or more control variables, if necessary. The objectives may be predefined, and may also be dependent on time, on any external inputs, on any process variables that are obtained from the building electrical system 102, and/or on the control variables themselves. Some examples of controller objectives for different applications are:

Minimize demand (kW) over a prescribed time interval;
Minimize demand charges ($) over a prescribed time interval;
Minimize total electricity charges ($) from the grid;
Reduce demand (kW) from the grid by a prescribed amount during a prescribed time window; and
Maximize the life of the energy storage device.

Objectives can also be compound—that is, a controller objective can be comprised of multiple individual objectives. One example of a compound objective is to minimize demand charges while maximizing the life of the energy storage device. Other compound objectives including different combinations of the individual objectives are possible.

The inputs that the controller 110 may use to determine (or otherwise inform a determination of) the control variables can include configuration, external inputs, and process variables.

Process variables are typically measurements of the electrical system state and are used by the controller 110 to, among other things, determine how well its objectives are being met. These process variables may be read and used by the controller 110 to generate new control variable values. The rate at which process variables are read and used by the controller 110 depends upon the application but typically ranges from once per millisecond to once per hour. For battery energy storage system applications, the rate is often between 10 times per second and once per 15 minutes. Examples of process variables may include:

Unadjusted net power
Unadjusted demand
Adjusted net power
Demand
Load (e.g., load energy consumption for one or more loads)
Generation for one or more loads
Actual ESS charge or generation rate for one or more ESS
Frequency
Energy storage device state of charge (SoC) (%) for one or more ESS
Energy storage device temperature (deg. C.) for one or more ESS
Electrical meter outputs such as kilowatt-hours (kWh) or demand.

A configuration received by the controller 110 (or input to the controller 110) may include or be received as one or more configuration elements (e.g., a set of configuration elements). The configuration elements may specify one or more constraints associated with operation of the electrical system. The configuration elements may define one or more cost elements associated with operation of the electrical system 102. Each configuration element may set a status, state, constant or other aspect of the operation of the electrical system 102. The configuration elements may be values that are typically constant during the operation of the controller 110 and the electrical system 102 at a particular location. The configuration elements may specify one or more constraints of the electrical system and/or specify one or more cost elements associated with operation of the electrical system.

Examples of configuration elements may include:
ESS type (for example if a battery: states of charge, chemistry, manufacturer, and cell model)

ESS configuration (for example, if a battery: number of cells in series and parallel) and constraints (such as maximum charge and discharge powers)

ESS efficiency properties

ESS degradation properties (as a function of SoC, discharge or charge rate, and time)

Electricity supply tariff (including time of use supply rates and associated time windows)

Electricity demand tariff (including demand rates and associated time windows)

Electrical system constraints such as minimum power import

ESS constraints such as SoC limits or power limits (including maximum and minimum state of charge)

Historic data such as unadjusted net power or unadjusted demand, weather data, and occupancy Operational constraints such as a requirement for an ESS to have a specified minimum amount of energy at a specified time of day.

External inputs are variables that may be used by the controller 110 and that may change during operation of the controller 110. Examples are weather forecasts (e.g., irradiance for solar generation and wind speeds for wind generation) and event data (e.g., occupancy predictions). In some embodiments, tariffs (e.g., demand rates defined therein) may change during the operation of the controller 110, and may therefore be treated as an external input.

The outputs of the controller 110 are the control variables that can affect the electrical system behavior. Examples of control variables are:

ESS power command (kW or %). For example, an ESS power command of 50 kW would command the ESS to charge at a rate of 50 kW, and an ESS power command of −20 kW would command the ESS to discharge at a rate of 20 kW.

Building or subsystem net power increase or reduction (kW or %)

Renewable energy increase or curtailment (kW or %). For example a photovoltaic (PV) system curtailment command of −100 kW would command a PV system to limit generation to no less than −100 kW. Again, the negative sign is indicative of the fact that that the value is generative (non-consumptive).

In some embodiments, control variables that represent power levels may be signed, e.g., positive for consumptive or negative for generative.

In one illustrative example, consider that an objective of the controller 110 may be to reduce demand charges while preserving battery life. In this example, only the ESS may be controlled. To accomplish this objective, the controller should have knowledge of a configuration of the electrical system 102, such as the demand rates and associated time windows, the battery capacity, the battery type and arrangement, etc. Other external inputs may also be used to help the controller 110 meet its objectives, such as a forecast of upcoming load and/or forecast of upcoming weather (e.g., temperature, expected solar irradiance, wind). Process variables from the electrical system 102 that may be used may provide information concerning a net electrical system power or energy consumption, demand, a battery SoC, an unadjusted building load, and an actual battery charge or discharge power.

In this one illustrative example, the control variable may be a commanded battery ESS's charge or discharge power. In order to more effectively meet the objective, the controller 110 may continuously track the peak net building demand (kW) over each applicable time window, and use the battery to charge or generate at appropriate times to limit the demand charges. In one specific example scenario, the ESS may be utilized to attempt to achieve substantially flat (or constant) demand from the electrical utility distribution system 150 (e.g., the grid) during an applicable time window when a demand charge applies.

Figure 2:
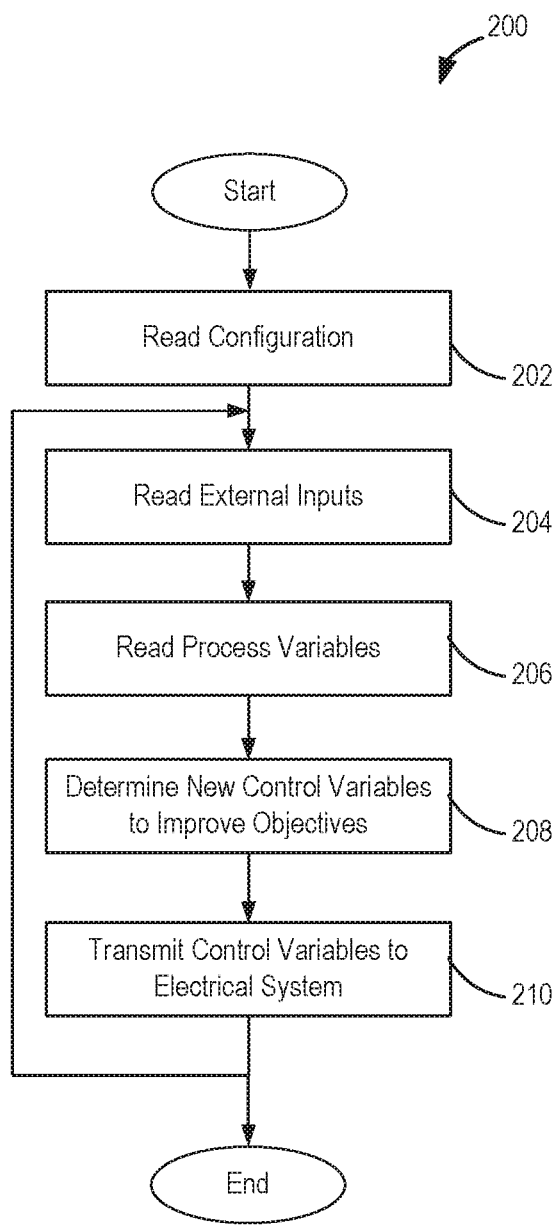
FIG. 2 is a flow diagram of a method or process of controlling an electrical system, according to one embodiment of the present disclosure.

FIG. 2 is a flow diagram of a method 200 or process of controlling an electrical system, according to one embodiment of the present disclosure. The method 200 may be implemented by a controller of an electrical system, such as the controller 110 of FIG. 1 controlling the building electrical system 102 of FIG. 1. The controller may read 202 or otherwise receive a configuration (e.g., a set of configuration elements) of the electrical system.

The controller may also read 204 or otherwise receive external inputs, such as weather reports (e.g., temperature, solar irradiance, wind speed), changing tariffs, event data (e.g., occupancy prediction, sizeable gathering of people at a location or venue), and the like.

The controller may also read 206 or otherwise receive process variables, which may be measurements of a state of the electrical system and indicate, among other things, how well objectives of the controller are being met. The process variables provide feedback to the controller as part of a feedback loop.

Using the configuration, the external inputs, and/or the process variables, the controller determines 208 new control variables to improve achievement of objectives of the controller. Stated differently, the controller determines 208 new values for each control variable to effectuate a change to the electrical system toward meeting one or more controller objectives for the electrical system. Once determined, the control variables (or values thereof) are transmitted 210 to the electrical system or components of the electrical system. The transmission 210 of the control variables to the electrical system allows the electrical system to process the control variables to determine how to adjust and change state, which thereby can effectuate the objective(s) of the controller for the electrical system.

Figure 3:
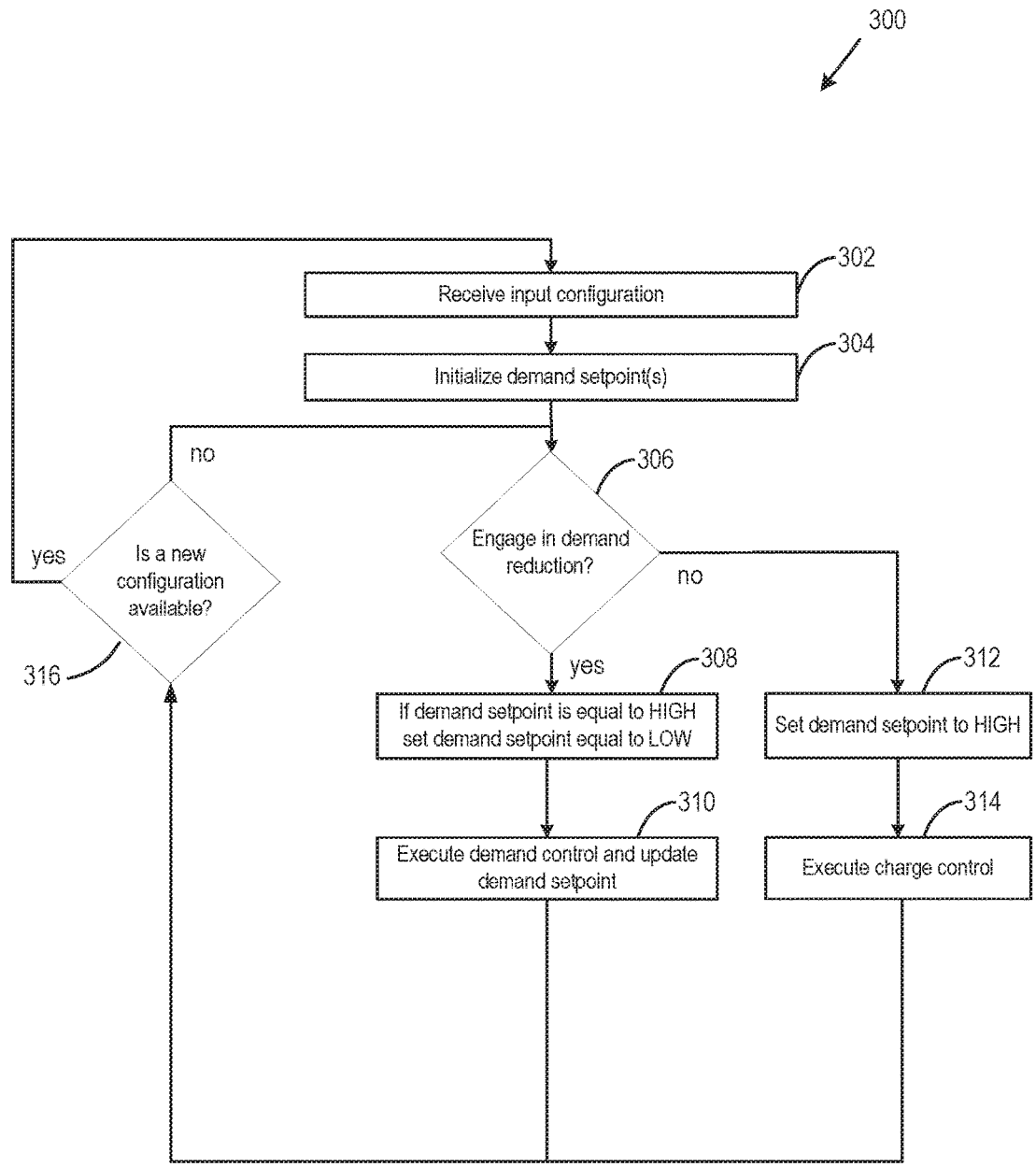
FIG. 3 is a flow diagram of a method of controlling an electrical system, according to one embodiment of the present disclosure.

FIG. 3 is a flow diagram of a method 300 of controlling an electrical system, according to one embodiment of the present disclosure. The method 300 may be a computer-implemented process executed by one or more computing devices, such as a multimode controller (e.g., the demand setpoint resolver 630 of FIG. 6). The method 300 may selectively cause the electrical system to engage in one of multiple modes to reduce demand charges.

The method 300 may receive 302 a configuration, or a set of configuration elements, of the electrical system. The configuration may specify one or more constraints of the electrical system. For example, the configuration may specify battery performance parameters, battery energy capacity, maximum battery charge and discharge rates, minimum import constraints, and the applicable utility tariff. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, equipment degradation cost, a tariff definition (e.g., an electricity supply tariff providing ToU supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, a value of comfort that may be a function of other process variables such as building temperature.

The method 300 may initialize 304 demand setpoint(s). A demand setpoint represents an upper limit on demand. A demand setpoint may be a value, a constant, or a variable that may be set to a value. In some embodiments, a multi-mode controller using the method 300 for tariffs with one daily demand window that does not span the full 24-hours, the setpoint can be initialized to HIGH. HIGH may be infinite or any value greater than the greatest possible adjusted net power. A high value setpoint may allow (or signal to the electrical system to allow) an ESS to charge.

A multi-mode controller using method 300 may determine 306 if the electrical system should engage in demand reduction. In some embodiments, the determination 306 to engage in demand reduction may be based on a predetermined time, an algorithm, or a schedule. For example, the determination 306 to engage in demand reduction may be based on whether the present time falls within a demand window, i.e. if a demand rate is presently in effect. The basis for entering demand reduction mode may be included in the input configuration.

If the multi-mode controller determines 306 that the electrical system should engage in demand reduction, the multi-mode controller may check to see if the demand setpoint is HIGH. If the demand setpoint is HIGH, the demand setpoint may be set 308 to LOW. LOW may be negative infinity, or any value lower than the lowest possible adjusted net power (which may be negative). After setting the demand setpoint to LOW, the demand control mode is executed 310. The demand control updates the demand setpoint to a value to reduce demand charges.

If the multi-mode controller determines that the electrical system should not engage 306 in demand reduction, the demand setpoint can be set 312 to HIGH, and a charge control mode is executed 314. In one embodiment, outside demand windows, the demand setpoint may be infinite or much greater than the net electrical system load in order to prevent a controller from executing demand reduction outside a demand window.

Thus, the method 300 determines the control mode (e.g., charge control mode or demand control mode) that an electric system should be placed in. In one embodiment, the control mode may be based on whether the present time falls within a demand window. The method 300 repeats for a next upcoming time domain (a new upcoming time domain). A determination 316 is made whether a new configuration is available. If yes, then the method 300 receives 302 the new configuration. If no, then the method 300 may skip receiving 302 the configuration and simply determine whether or not to engage 306 in demand reduction. The rate at which the method 300 is executed can vary. In typical applications of controlling an ESS to limit demand for a building, the rate may be between once per second and once per hour.

Figure 4:
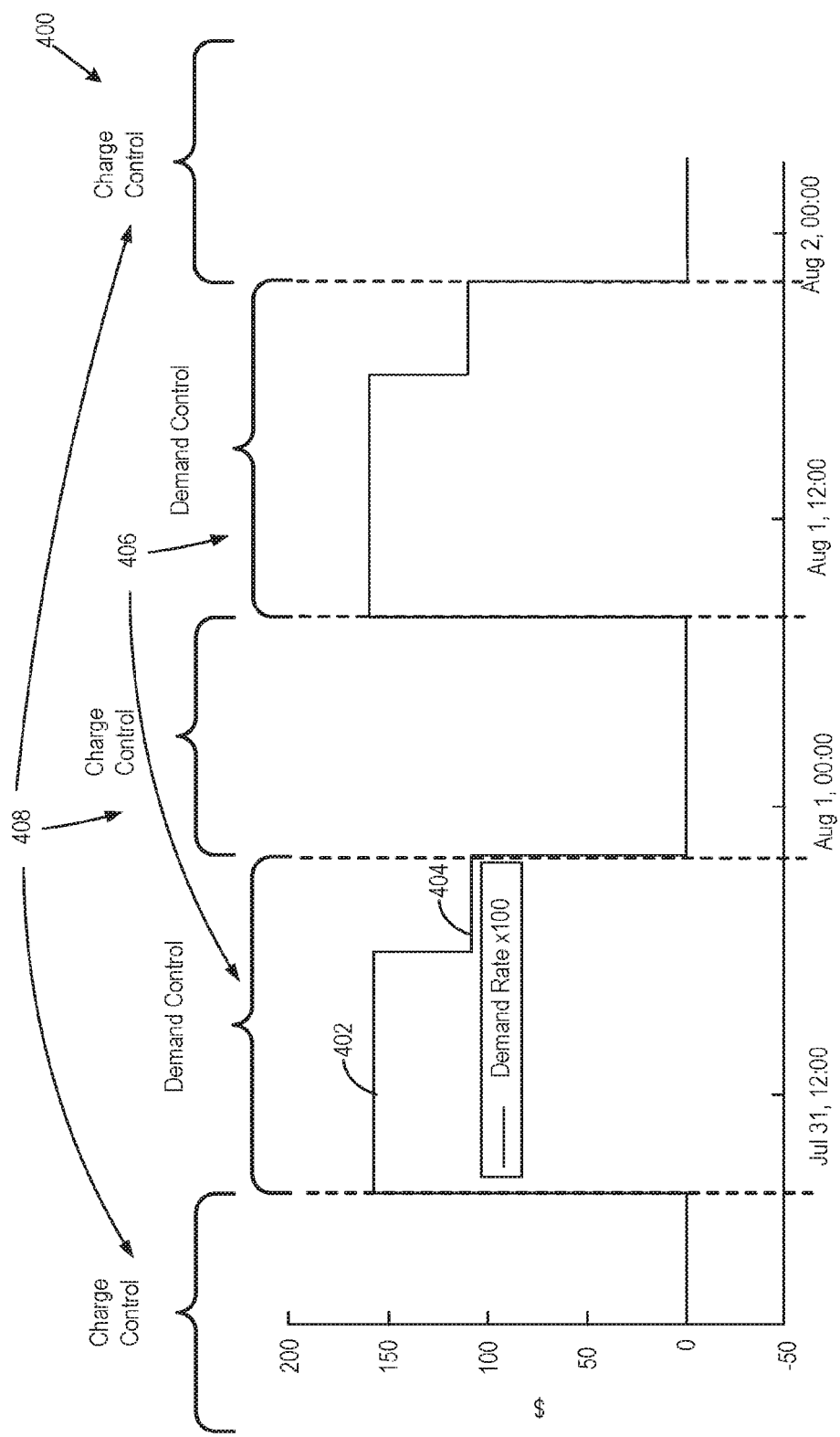
FIG. 4 is a graph illustrating time periods in which a controller may implement different control modes for an ESS, according to one embodiment.

FIG. 4 is a graph 400 illustrating time periods in which a controller may implement different control modes for an ESS, according to one embodiment. The graph depicts a tariff with two daily demand windows where one overlaps the other. As shown, the two daily demand rates (i.e., 402, and 404) are overlapping: one with a daily demand window of 8 am to 6 pm where the customer is charged $0.49 per peak kW of demand, and with a daily demand window of 8 am to 10 pm where the customer is charged $1.11 per kW. At other times in this graph 400, there are times of each day when no demand charges are applicable.

As shown, a controller may set or otherwise operate in different modes (e.g. demand control mode 406 and charge control mode 408) based on the demand window. For example, when the present time falls within a demand window, a controller may implement a demand control mode that performs demand control to limit the demand to no more than a demand setpoint. In the charge control mode 408, the controller may provide a command to the ESS to charge a battery.

In some embodiments, the demand control mode 406 may not only set a demand point, but also charges the battery if possible at the same time. This combined demand+charge control mode may be utilized in some applications such as "peak shaving" where the unadjusted net load is sometimes above the demand setpoint and sometimes below, and the battery size is a limiting factor in the amount of demand reduction that can be achieved. Such a combined demand+charge control mode may also be useful for demand charges that span a full 24-hr day. In these cases, the demand+charge controller may use periods of low net building load to charge the battery without increasing the established maximum demand for that day.

In some embodiments, different demand setpoints can be maintained for multiple or overlapping demand windows. For example, a first demand setpoint may be established during a first demand window (e.g., demand window with demand rate 402) and a second demand setpoint may be established during a second demand window (e.g., demand window with demand rate 404).

The embodiments of controllers described with reference to FIGS. 5 and 6 generate control variables which control a building electrical system and cause an ESS to charge or generate (discharge) at different moments in time. These embodiments of controllers may be combined into a single multi-mode controller or may be separate as illustrated.

Charge Control Mode

Figure 5:
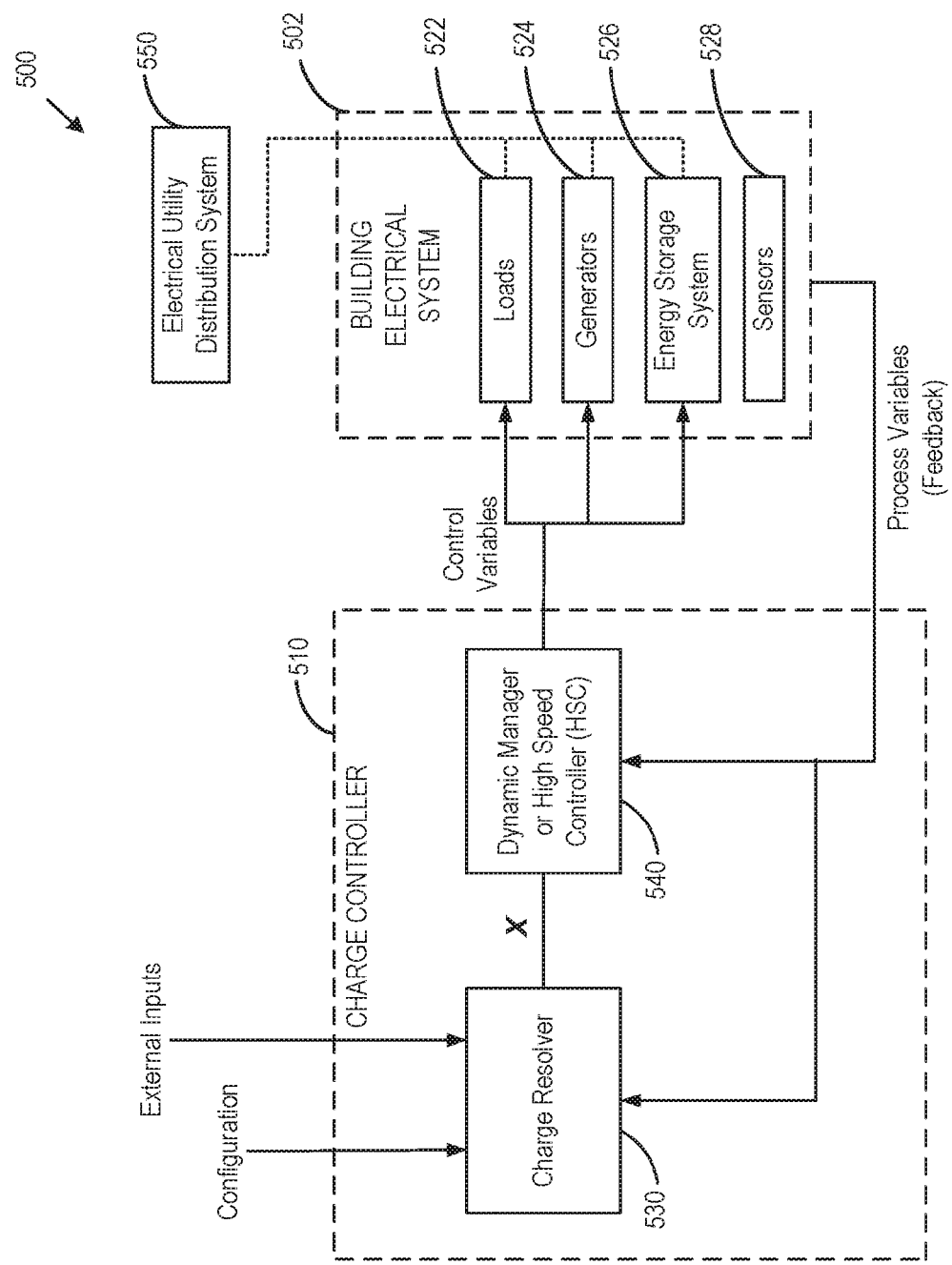
FIG. 5 is a control diagram of an electrical system with a charge controller, according to one embodiment of the present disclosure.

FIG. 5 is a control diagram of an electrical system 500 with a charge controller 510, according to one embodiment. The charge controller 510 generates control variables, which control a building electrical system 502 and cause an ESS 526 to charge or generate (discharge) at different moments in time.

The electrical system 500 comprises the building electrical system 502 that is controlled by the charge controller 510. The building electrical system 502 includes one or more loads 522, one or more generators 524, the ESS 526, and one or more sensors 528 (e.g., meters) to provide measurements or other indication(s) of a state of the building electrical system 502. The building electrical system 502 is coupled to an electrical utility distribution system 550, and therefore may be considered on-grid. Similar diagrams can be drawn for other applications such as a photovoltaic generator plant and an off-grid building.

The charge controller 510 receives configuration information of the electrical system 500, external inputs, and process variables and produces control variables to be sent to the electrical system 500 to effectuate a change to the electrical system 500 toward meeting a controller objective (e.g., more economical operation) of the electrical system 500. The charge controller 510 may include electronic hardware and software to process the inputs (e.g., the configuration of the electrical system 500, external inputs, and process variables) to determine values for each of the control variables. The charge controller 510 may include one or more processors and suitable storage media which stores programming in the form of executable instructions which are executed by the processors to implement the control processes.

In the embodiment of FIG. 5, the charge controller 510 includes a charge resolver 530 and a dynamic manager 540 (or high speed controller (HSC)). The charge resolver 530 according to some embodiments is presumed to have ability to measure or obtain a current date and time. The charge resolver 530 may determine a set of values for a control parameter set X and provide the set of values and/or the control parameter set X to the HSC 540.

The charge resolver 530 uses a charge control algorithm to determine a set of values for the control parameter set X. In some embodiments, the charge algorithm may consider specific configuration and/or external inputs along with the process variables. Some examples of configuration information, external inputs, and process variables the charge algorithm may consider are:

Past, present, or future-predicted ESS state of charge
Past, present, and/or future time-of-use electricity supple rate
Charge power limits due to size of the ESS or energy conversion systems that are part of the ESS
ESS efficiency as a function of charge rate and state of charge
ESS energy storage device degradation rate as a function of state of charge and/or charge rate
Remaining time in charge control mode
ESS size
Past, present, or predicted unadjusted net load
Past, present, or predicted adjusted net load
Past, present, or predicted ESS power For example, if the ESS efficiency is higher at lower charge rates, the charge control algorithm may select a ESS charge that is the minimum required to fully charge the battery within the remaining time in charge control mode.

The HSC 540 utilizes the set of values for the control parameter set X to determine the control variables to communicate to the electrical system 500. The HSC 540 in some embodiments is also presumed to have ability to measure or obtain a current date and time. The two part approach of the charge controller 510, namely the charge resolver 530 determining control parameters and then the HSC 540 determining the control variables, enables generation of a lasting set of controls, or a control solution (or plan) that can be used into the future rather than a single control to be applied at the present.

The two part approach of the charge controller 510 enables the charge resolver 530 to be disposed or positioned at a different location from the HSC 540. In this way, intensive computing operations can be performed by resources with higher processing capability that may be located remote from the building electrical system 502. These intensive computing operations may be performed, for example, at a data center or server center (e.g., in the cloud).

In one embodiment, the charge controller 510 and one or more of its components are executed as software or firmware (for example stored on non-transitory media, such as appropriate memory) by one or more processors. For example, the charge resolver 530 may comprise one or more processors to process the inputs and generate the set of values for the control parameter set X. Similarly, the HSC 540 may comprise one or more processors to process the control parameter set X and the process variables and generate the control variables. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Demand Control Mode

Figure 6:
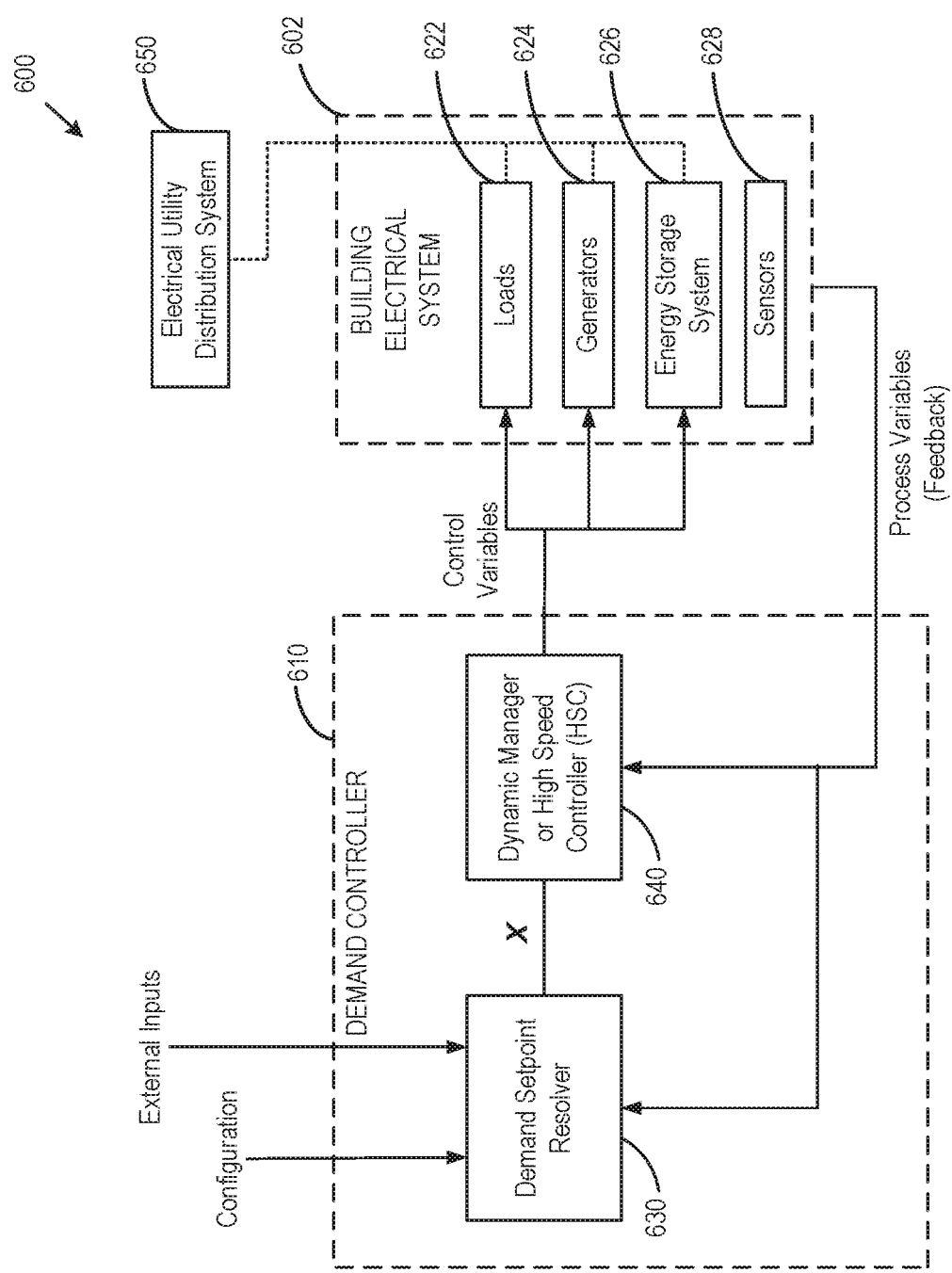
FIG. 6 is a control diagram of an electrical system with a demand controller, according to one embodiment of the present disclosure.

FIG. 6 is a control diagram of an electrical system 600 with a demand controller 610, according to one embodiment. The demand controller 610 generates control variables which control a building electrical system 602 and cause an ESS 626 to charge or generate (discharge) at different moments in time.

The electrical system 600 comprises the building electrical system 602 that is controlled by the demand controller 610. The building electrical system 602 includes one or more loads 622, one or more generators 624, the ESS 626, and one or more sensors 628 (e.g., meters) to provide measurements or other indication(s) of a state of the building electrical system 602. The building electrical system 602 is coupled to an electrical utility distribution system 650, and therefore may be considered on-grid. Similar diagrams can be drawn for other applications such as a photovoltaic generator plant and an off-grid building.

The demand controller 610 receives configuration information of the electrical system 600, external inputs, and process variables and produces control variables to be sent to the electrical system 600 to effectuate a change to the electrical system 600 toward meeting a controller objective for the electrical system 600. The demand controller 610 may include electronic hardware and software to process the inputs (e.g., the configuration of the electrical system 600, external inputs, and process variables) to determine values for each of the control variables. The demand controller 610 may include one or more processors and suitable storage media to store programming in the form of executable instructions, which are executed by the processors to implement the control processes.

In the embodiment of FIG. 6, the demand controller 610 includes a demand setpoint resolver 630 and a dynamic manager 640 (or high speed controller (HSC)). The demand setpoint resolver 630 according to some embodiments is presumed to have ability to measure or obtain a current date and time. The demand setpoint resolver 630 may determine a demand setpoint. The demand setpoint resolver 630 may determine a demand setpoint with a value that, if complied with by the electrical system 600, limits peak energy consumption of the electrical system 600 during the future time period and maintains a battery state of charge above a desired minimum state of charge during a future time period. As will be described, the demand setpoint resolver 630 may determine the demand setpoint by performing one or more simulations of operation of the electrical system 600 for the future time period. Each of the one or more simulations may apply an iteration of a demand setpoint (e.g., a candidate demand setpoint value) to a model of the electrical system 600. The model may include or otherwise account for the predicted net power consumption.

In the embodiment of FIG. 6, the demand setpoint resolver 630 determines a demand set point as part of determining a set of values for a control parameter set X.

The demand setpoint resolver 630 provides the set of values and/or the control parameter set X to the HSC 640 to effectuate a change to the electrical system 600 to comply with the demand setpoint. The electrical system 600 complies with the demand setpoint by maintaining power consumption below the demand setpoint. The demand setpoint resolver 630 uses a demand setpoint algorithm to determine a set of values for the control parameter set X to effectuate a change to the electrical system 600 to comply with the demand setpoint. In some embodiments, the demand setpoint algorithm may consider specific configuration and/or external inputs along with the process variables. Some examples of configuration information, external inputs, and process variables the charge algorithm may consider are:

- Past, present, or future-predicted ESS state of charge
- Past, present, and/or future time-of-use electricity supple rate
- Past, present, and/or future demand rate
- Charge power limits due to size of the ESS or energy conversion systems that are part of the ESS
- ESS efficiency as a function of charge rate and state of charge
- ESS energy storage device degradation rate as a function of state of charge and/or charge rate
- Remaining time in charge control mode
- ESS size
- Past, present, or predicted unadjusted net load
- Past, present, or predicted adjusted net load
- Past, present, or predicted ESS power For example, if the past or present ESS power multiplied by remaining time in the future time domain is greater than the remaining ESS energy, the demand setpoint resolver 630 may choose a control parameter set X that calls for a decrease in ESS power and an increase in generator power 624 to comply with the demand setpoint.

The HSC 640 utilizes the set of values for the control parameter set X to determine the control variables to communicate to the electrical system 600. The control variables effectuate a change to the building electrical system 602 to comply with the demand setpoint. For example, the control variables may cause the ESS 626 to increase energy distribution to the loads 622. The HSC 640 in some embodiments is also presumed to have ability to measure or obtain a current date and time. The two part approach of the demand controller 610, namely, the demand setpoint resolver 630 determining control parameters and then the HSC 640 determining the control variables, enables generation of a lasting set of controls, or a control solution (or plan) that can be used into the future rather than a single control to be applied at the present.

The two part approach of the demand controller 610 enables the demand setpoint resolver 630 to be disposed or positioned at a different location from the HSC 640. In this way, intensive computing operations that may be involved in determining a demand setpoint and/or values for the control parameter set X can be performed by resources with higher processing capability that may be located remote from the building electrical system 602. These intensive computing operations may be performed, for example, at a data center or server center (e.g., in the cloud).

In one embodiment, the demand controller 610 and one or more of its components are executed as software or firmware (for example stored on non-transitory media, such as appropriate memory) by one or more processors. For example, the demand setpoint resolver 630 may comprise one or more processors to process the inputs and generate the set of values for the control parameter set X. Similarly, the HSC 640 may comprise one or more processors to process the control parameter set X and the process variables and generate the control variables. The processors may be computers, microcontrollers, CPUs, logic devices, or any other digital or analog device that can operate on pre-programmed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Demand Windows, Setpoint, and Future Time Domain

An objective of the demand controller 610 from FIG. 6 is to generate demand setpoints for future time domains to limit demand charges. A demand setpoint is an upper bound (UB) or upper limit on adjusted demand. In other words, the demand setpoint is the adjusted demand value that is not to be exceeded by the electrical system 600 (including loads, generation, and ESS consumption or generation) during a given time period. Demand setpoint may be expressed in units of power such as kW.

A demand setpoint can be associated with a specific demand window. Multiple demand setpoints can also be associated each with a separate demand window. Alternately, a single demand setpoint can be associated with any number of contiguous or overlapping demand windows.

A future time domain is a period of the time in the future. The length of the period of time may be set by configuration inputs. For example, a future time domain may be defined as the span of time from the present until the end of the current demand window or the end of multiple contiguous demand windows. In some embodiments, the future time domain can end when the demand rate becomes substantially lower than the current demand rate. In this embodiment, the future time domain ends when demand charges are no longer significant. In some embodiments, the future time domain can be selected to end at any time the demand rate changes. In some embodiments, a different minimum battery state of charge can be maintained for each demand window, and even for different groupings of overlapping demand windows.

Figure 7:
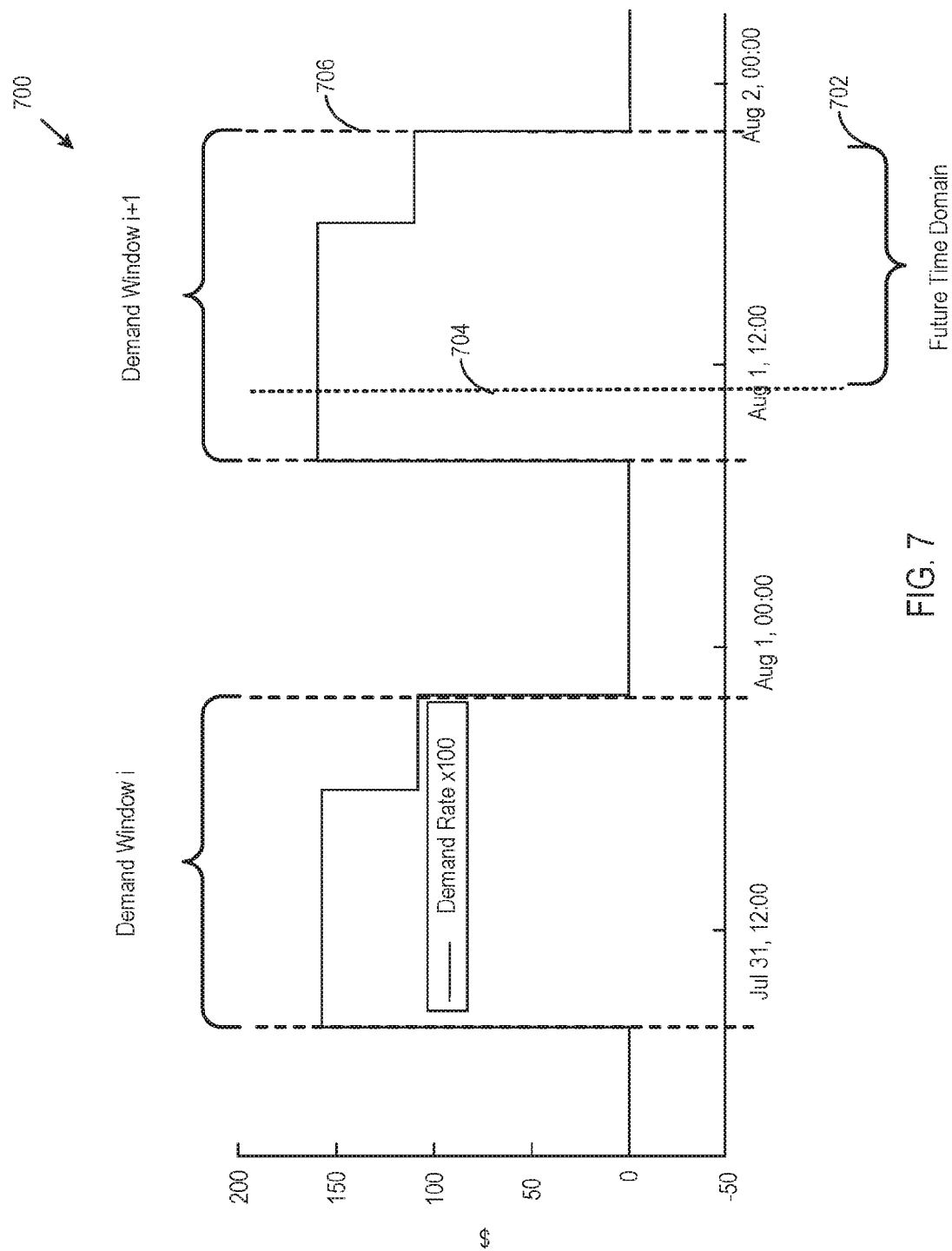
FIG. 7 is a graph illustrating a configuration in which a future time domain is defined as the span of time from the present until the end of the current demand window, or until the end of all contiguous demand windows.

FIG. 7 is a graph 700 illustrating a configuration in which a future time domain 702 is defined as the span of time from a present 704 until the end of a current demand window 706, or until the end of a plurality of contiguous demand windows. FIG. 7 illustrates this for the example in FIG. 4.

Figure 8:
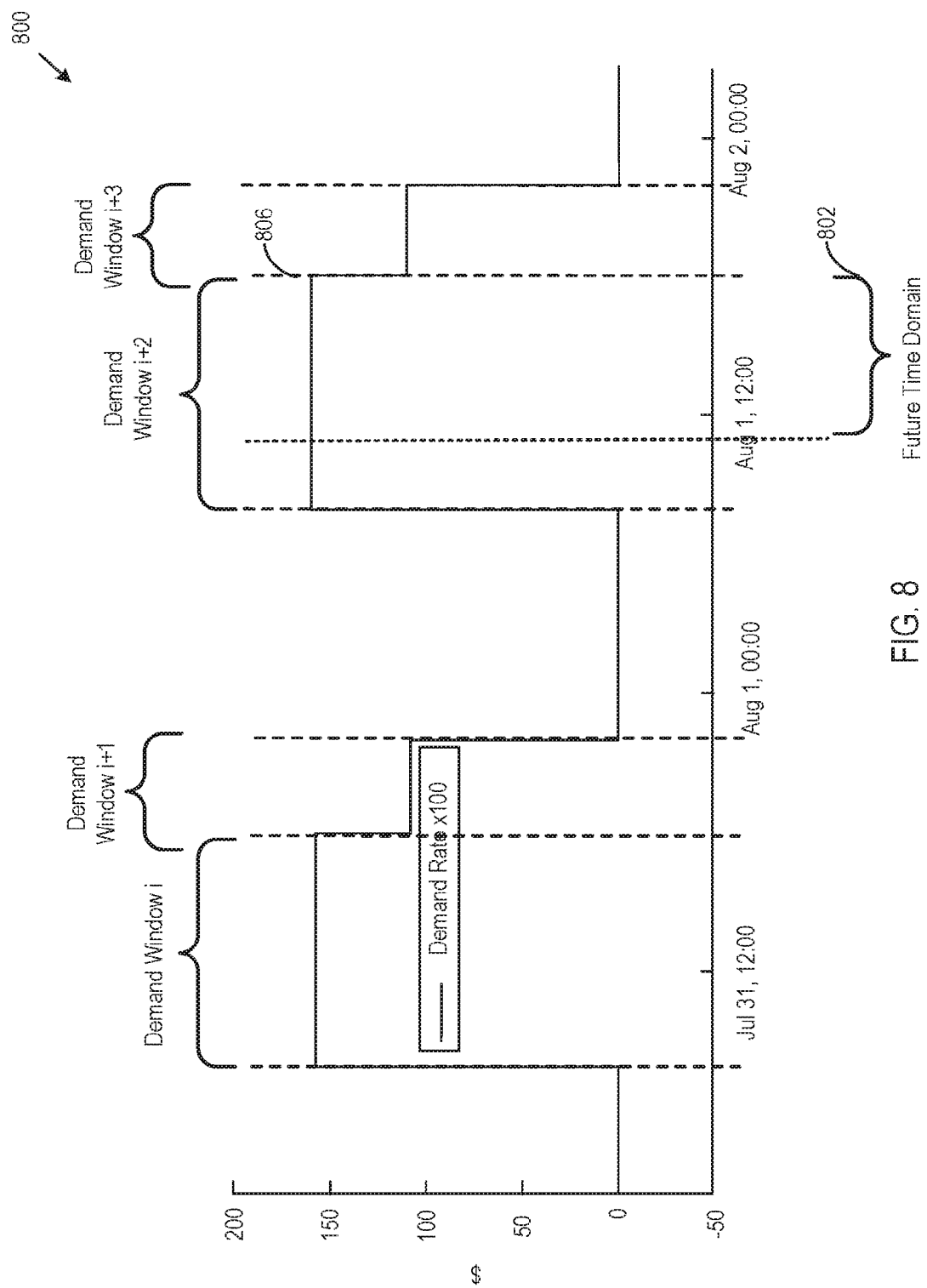
FIG. 8 is a graph illustrating one embodiment where the future time domain 802 is selected to end when the demand rate changes.

FIG. 8 is a graph 800 illustrating one embodiment where a future time domain 802 is selected to end when a demand rate changes 806. In other embodiments, for multiple or overlapping demand windows, a different minimum battery state of charge can be maintained for each demand window.

During a demand period, if the actual net building demand exceeds the demand setpoint, the demand setpoint may be raised. In some embodiments, the new demand setpoint may be set to a value near the actual present demand or more than the recently adjusted demand. The setpoint may also be raised to a new value equal to the actual present or recent demand setpoint minus a threshold value, but only if the new value is greater than the present demand setpoint. This may prevent small excursions above the demand setpoint from causing increases in the demand setpoint.

In some embodiments, the demand setpoint may be periodically reset to LOW. In some embodiments the demand setpoint reset may coincide with how frequently the demand charge is calculated. For example, in an embodiment where the demand charges are calculated on a daily basis (per the applicable tariff), the demand setpoint may be reset to LOW at the start of each new day's demand window. In another embodiment where the demand charges are calculated on a monthly basis but with more than one noncontiguous demand window occurring during each month, the demand setpoint may be stored in memory and restored at the beginning of each subsequent demand window during that month. The demand setpoint may be reset to LOW at the beginning of a new month or the beginning of a new billing cycle.

Demand Setpoint Resolver Process

Figure 9:
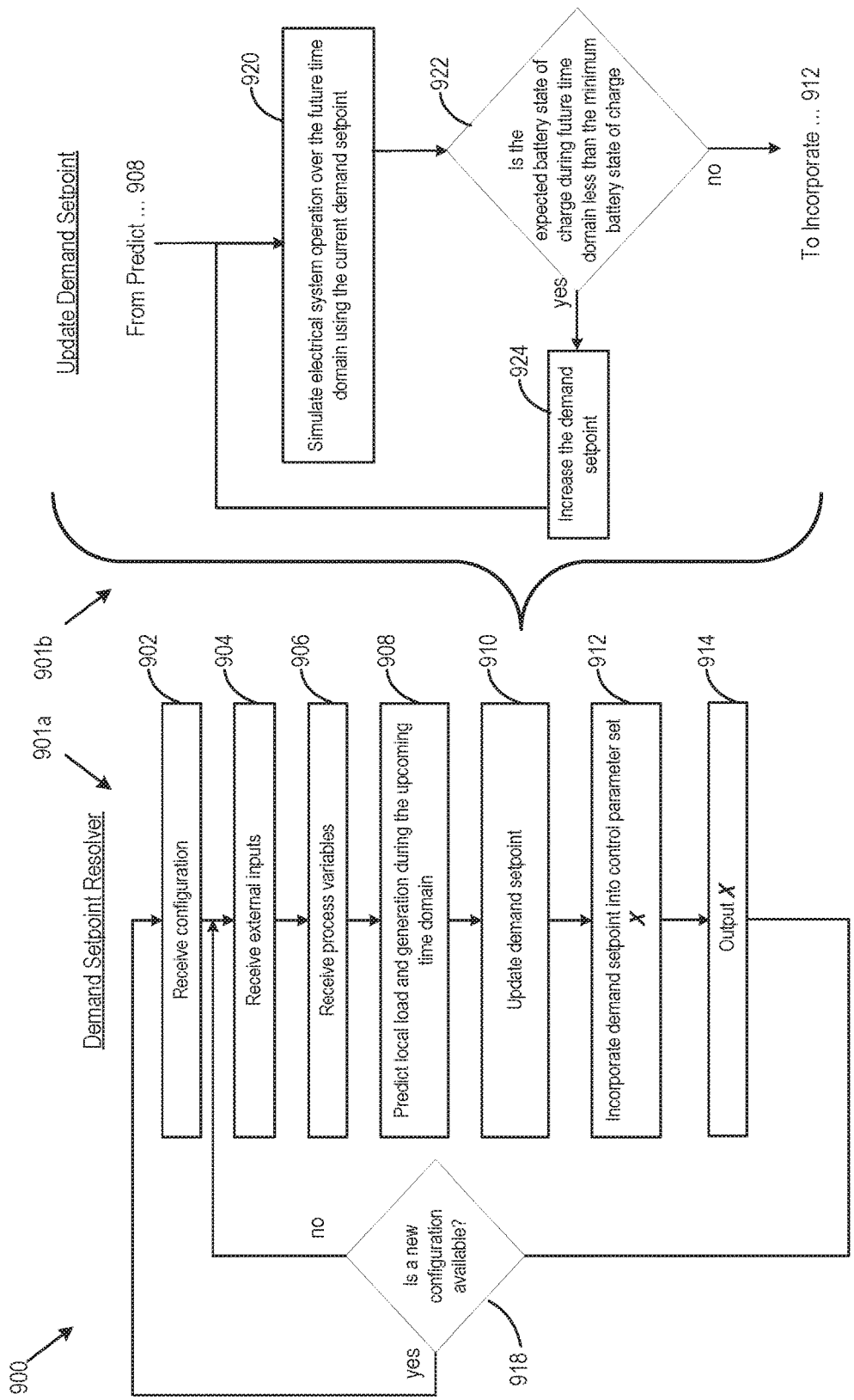
FIG. 9 is a flow diagram of a method of setting a demand setpoint, according to one embodiment of the present disclosure.

The following sections provide details about elements of the demand setpoint resolver process according to example embodiments of the disclosure. FIG. 9 shows an example process of a demand setpoint resolver, such as shown in FIG. 6.

FIG. 9 is a flow diagram of a method 900 of setting a demand setpoint, according to one embodiment of the present disclosure. The method 900 includes a demand setpoint resolver process 901a and an update demand setpoint sub-process 901b. In some embodiments, the update demand setpoint sub-process 901b may execute separate from, or even independent from, the demand setpoint resolver process 901a, based on a control parameter set X determined at an earlier time by the demand setpoint resolver process 901a. Because the demand setpoint resolver process 901a can run separate and distinct from the update demand setpoint sub-process 901b, the execution of these processes 901a, 901b may be collocated on a single system or isolated on remote systems.

The demand setpoint resolver process 901a may be a computer-implemented process executed by one or more computing devices, such as the demand setpoint resolver 630 of FIG. 6. The demand setpoint resolver process 901a may receive 902 a configuration, or a set of configuration elements, of the electrical system. The configuration may specify one or more constraints of the electrical system. For example, the constraints may include a minimum battery state of charge that defines how far a battery may be depleted. The configuration may specify one or more constants of the electrical system and an electricity demand tariff providing demand rates and associated time windows.

External inputs may also be received 904. The external inputs may provide indication of one or more conditions that are external to the controller and/or the electrical system. For example, the external inputs may provide indication of the temperature, weather conditions (e.g., patterns, forecasts), and the like.

Process variables are received 906. The process variables provide one or more measurements of a current state of the electrical system. The set of process variables can be used to determine progress toward meeting an objective (e.g., more economical operation) of the electrical system. The process variables may be feedback in a control loop for controlling the electrical system.

The demand setpoint resolver process 901a may include predicting 908 a local load and/or generation during an upcoming time domain. The predicted 908 local load and/or local generation may be stored for later consideration. For example, the predicted 908 load and/or generation may be used in a later process of evaluating (e.g., determining, simulating operation of the electrical system using) the demand setpoint in a future time period.

A setpoint may be updated 910 to be applied during an upcoming or current time domain. The setpoint may be updated 910 using the update demand setpoint sub-process 901b. The update demand setpoint sub-process 901b may simulate 920 electrical system operation over the future time domain using the current demand setpoint. The current demand setpoint may be a candidate setpoint value used in the simulation 920. The expected battery state of charge during future time domain based on the simulation 920 may be compared 922 to the minimum battery state of charge. The minimum battery state of charge may be a value. In some embodiments, the minimum state of charge may be a variable or a function that may change based on other conditions. For example, the minimum state of charge may be a function of demand rates. For instance if a demand rate is high the minimum state of charge may be lower than if the demand rate is low. If the battery state of charge is less than the minimum battery state of charge, the demand setpoint is increased 924 and a new simulation 920 begins.

The updated demand setpoint is incorporated 912 into the control parameter set X. The control parameter set X is then output 914. In some embodiments, the control parameter set X may be altered based on the setpoint. In some embodiments, the output 914 of the control parameter set X may be stored locally, such as to memory, storage, circuitry, and/or a processor disposed local to the demand setpoint resolver process 901a. In some embodiments, the outputting 914 may include transmission of the control parameter set X over a communication network to a remote computing device, such as the HSC 640 of FIG. 6.

The demand setpoint resolver process 901a repeats for a next upcoming time domain (a new upcoming time domain). A determination 918 is made whether a new configuration is available. If yes, then the demand setpoint resolver process 901a receives 902 the new configuration. If no, then the demand setpoint resolver process 901a may skip receiving 902 the configuration and simply receive 904 the external inputs.

Predicting a Load/Generation of an Upcoming Time Domain

In many electrical system control applications, a load of the electrical system (e.g., a building load) changes over time. Load can be measured as power or as energy change over some specified time period, and is often measured in units of kW. As noted above with reference to FIG. 9, a demand setpoint resolver process 901a may predict 908 a local load and/or generation during an upcoming time domain.

Figure 10:
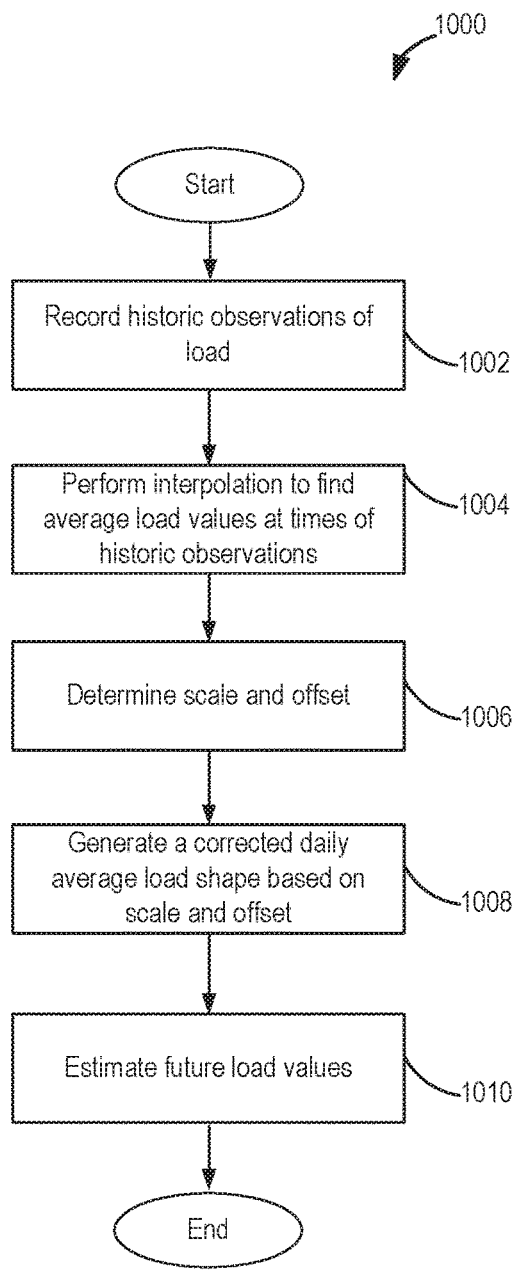
FIG. 10 is a flow diagram of a method of predicting load and/or generation of an electrical system during an upcoming time domain, according to one embodiment of the present disclosure.

FIG. 10 is a flow diagram of a method 1000 of predicting load and/or generation of an electrical system during an upcoming time domain. A controller, according to some embodiments of the present disclosure, may have the ability to predict the changing load that may be realized during an upcoming time domain. An accurate estimate of upcoming load can enable the demand setpoint resolver to improve its confidence in determining a demand setpoint.

A method of predicting load, according to one embodiment of the present disclosure, may perform a load prediction considering historic periodic trends or shapes such as a daily trend or shape. The load prediction can execute every time a demand setpoint resolver executes a demand setpoint resolver process, or it can execute more or less frequently. The load prediction may be executed by performing a regression of a parameterized historic load shape against historic load data (typically less than or equal to 24 hours) in one embodiment. Regression algorithms such as least squares may be used. A compilation of historic trends may be recorded as a historic average (or typical) profile or an average load shape. The historic average profile or average load shape may be a daily (24-hour) historic average profile that represents a typical day. The compilation of historic observations and/or historic average profile may be received from another system, or may be gathered and compiled (or learned) as part of the method of predicting load, as will be explained below with reference to FIG. 8.

Referring to FIG. 10, historic observations of load are recorded 1002. For example, the last h hours of historic observations of load may be continuously recorded 1002 and stored in memory, each measurement having a corresponding time of day at which time it was measured in an array pair historic_load_observed and historic_load_observed_time_of_day. The last h hours can be any amount of time, but in one embodiment, it is between 3 and 18 hours.

Assume for now a daily average load shape array or vector is in memory named avg_load_shape, each with a corresponding array avg_load_shape_time_of_day of the same length. The avg_load_shape and avg_load_shape_time_of_day represent a historic average profile and/or historic trends. The time domain of avg_load_shape_time_of_day is 24 hours, and the time interval of discretization of avg_load_shape_time_of_day could be any value. Between 5 and 120 minutes may be used, depending on the application, in some embodiments. As an example, if the interval of discretization is chosen to be 30 minutes, there will be 48 values comprising avg_load_shape and 48 values comprising avg_load_shape_time_of_day.

An interpolation is performed 1004 to find the avg_load_shape values at each of the times in historic_load_observed_time_of_day. Call this new interpolated array avg_load_shape_interpolated. Consider mathematically avg_load_shape_interpolated with a scale and offset defined as: average_load_shape_interpolated_p=avg_load_shape_interpolated*scale+offset. In some embodiments, the interpolation is a linear interpolation. In other embodiments, the interpolation is a nonlinear interpolation.

A scale and offset are determined 1006. For example, the method 1000 may perform a least squares regression to determine 1006 scale and offset that minimize the sum of the squares of the error between average_load_shape_interpolated_p and historic_load_observed. Call these resulting scale and offset values scale_fit and offset_fit. In some embodiments, the determining 1006 of scale and offset can utilize weighted least squares techniques that favor more recent observations.

A corrected daily average load shape is generated 1008 based on the scale and/or offset. For example a corrected load shape may be generated 1008 for a full day as avg_load_shape_fit=avg_load_shape*scale_fit+offset_fit.

The future load values can then be estimated 1010, such as by interpolating. A future load value at any time of day in the future time domain can now be estimated 1010 by interpolating to that time of day from the pair of arrays avg_load_shape_fit and avg_load_shape_time_of_day.

Figure 11:
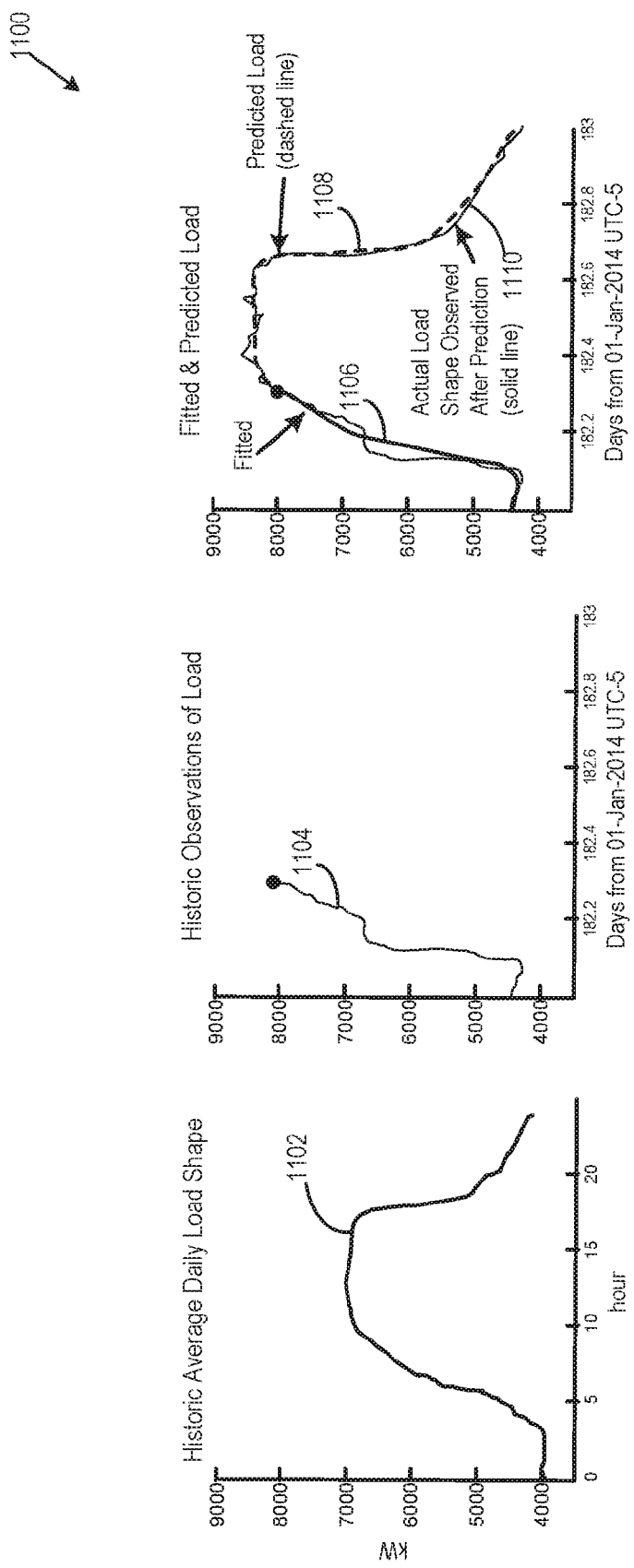
FIG. 11 provides a graphical representation of predicting load and/or generation of an electrical system during an upcoming time domain, according to one embodiment of the present disclosure.

FIG. 11 provides a graphical representation 1100 of predicting load and/or generation of an electrical system during an upcoming time domain, according to one embodiment. The graphical representation 1100 may track the method 1000 of FIG. 10. A historic average daily load shape 1102 is generated or learned. Historic observations of load 1104 are generated. A fitted current day historic load shape 1106 is generated. A predicted load shape 1108 can then be generated. The predicted load shape 1108 is fairly accurate based on an actual load shape observed 1110.

One advantage of a method of predicting load and/or generation of an electrical system during an upcoming time domain, such as previously described, compared to other methods, is that such method can adapt to changes in load scale and offset while still conforming to the general expected average daily load shape. In other embodiments, the predicted load can be further modified after it has been calculated with the above method. For example, the predicted load may be modified to bring it closer to the daily average historic load as the prediction time becomes farther away from the time the prediction was made.

As mentioned previously, in certain embodiments, a method of predicting load may include compiling or otherwise gathering historic trends to determine a historic average profile or an average load shape on a typical day. One possible method for load learning (e.g., determining and updating avg_load_shape) is as follows:

1) Create arrays avg_load_shape and avg_load_shape_time_of_day which are defined as above. Initialize avg_load_shape to some reasonable value such as a constant load equal to the current load, or to an initial load shape provided in the configuration information.

2) Begin recording load observations and storing each along with its associated time of day in historic_load_observed_2 and historic_load_observed_time_of_day_2.

3) After at least one full day of load observations has been stored in historic_load_observed_2 and historic_load_observed_time_of_day_2, assign a last 24 hours of load data in historic_load_observed_2 to a temporary array in memory named avg_load_shape_last_24_hr which has the same number of elements as avg_load_shape, and whose associated time of day vector is also avg_load_shape_time_of_day. To perform this operation, a number of well-known approaches can be used including regression and interpolation, linear weighted averaging, and nearest neighbor.

4) Assign avg_load_shape_last_24_hr to avg_load_shape.

5) Wait for a new 24-hour period of data to be recorded in historic_load_observed_2 and historic_load_observed_time_of_day_2.

6) Again assign the last 24 hours of load data in historic_load_observed_2 to a temporary array in memory named avg_load_shape_last_24_hr which has the same number of elements as avg_load_shape, and whose associated time of day vector is also avg_load_shape_time_of_day. Again to perform this operation, a number of well-known approaches can be used including regression and interpolation, linear weighted averaging, and nearest neighbor.

7) Update each element k of avg_load_shape by performing a digital filter operation with it and avg_load_shape_last_24_hr. In one embodiment, this digital filter operation is performed as a first order infinite impulse response (IIR) filter with the inputs being elements k of avg_load_shape_last_24_hr and the original avg_load_shape, and the output being a modified element k of avg_load_shape. In one embodiment, the time constant of the first order IIR filter is set to between 2 and 60 days. Other types of digital filters including low pass digital filters may be used.

8) Return to 5 above.

Some unique advantages of this embodiment of learning and predicting load and/or generation are obtained. For example, previous load information to construct an average daily load shape is not required. It learns the average daily load shape day by day as it observes the actual load. It requires very little memory: only enough for 24 hours of observed load, the load shape itself (24 hours), and supporting arrays and scalar values. Due to the filtering described above, it allows the load shape to change seasonally as seasonal changes occur and are observed. In other words, it is adaptive.

The method 1000 of FIG. 10 and illustration of FIG. 11 describe one embodiment of a method for predicting load. If a local generator is present in an electrical system, the same or a similar method can be applied for predicting generation. Instead of a "load shape," a "generation shape" can be stored in memory. For generators where the generation is known at a particular time (such as a photovoltaic generator which would be expected to have nearly zero generation at nighttime), the prediction and generation shape can be constrained to specific values at specific times of the day. In this case, instead of using regression to determine both scale and offset, perhaps only scale may be needed.

Another aspect of this embodiment of a method to predict load and/or generation is the ability to incorporate external inputs to modify the prediction of load or generation. In one embodiment, the prediction is made as already described, then the prediction is modified with the use of external information such as a weather forecast or building occupancy forecast.

By having a pre-determined differential relationship for load (or generation) vs. input data, the prediction can be modified in one example as follows:

1) An external input is read which contains a forecasted variable $x_{input,forecast}$.

2) From configuration information, a value of the differential $$\left[\frac{d(\text{load})}{d(x_{input})}\right]_{x_{nom}}$$

is available which is valid near some nominal $x_{input}$ value of $x_{nom}$.

3) The predicted load can be modified to account for the difference between the input $x_{input}$ and $x_{nom}$:

$$load_{predicted,modified} = load_{predicted} + (x_{input,forecast} - x_{nom}) \times \left[\frac{d(\text{load})}{d(x_{input})}\right]_{x_{nom}}$$

The same approach can be used for modifying a generation prediction by replacing "load" with "generation" in the formula above.

Figure 12:
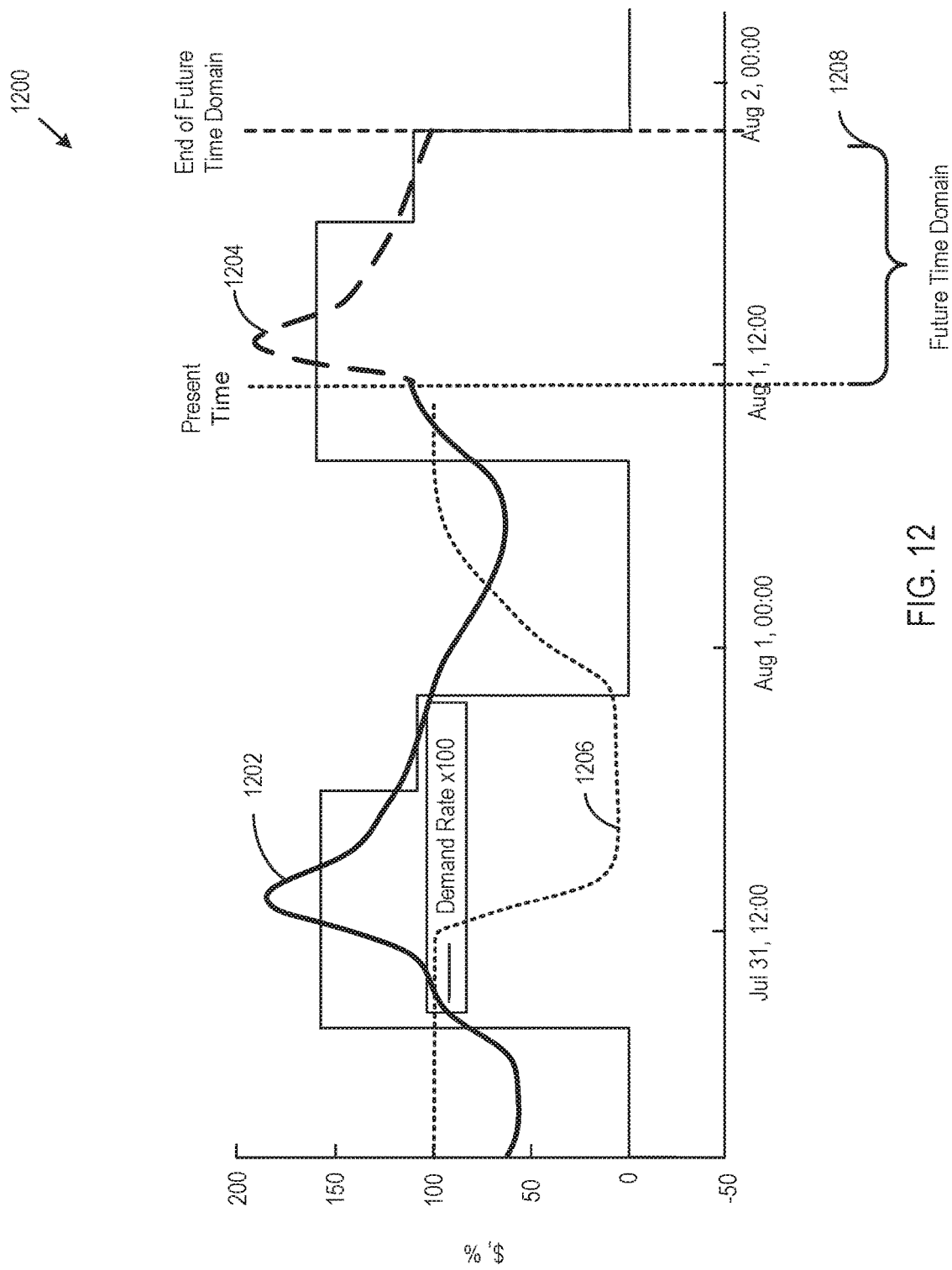
FIG. 12 is a graph illustrating one embodiment of an actual load and predicted building load, according to one embodiment of the present disclosure.

FIG. 12 is a graph 1200 illustrating one embodiment of an actual load 1202 and predicted building load 1204. The process described with reference to FIGS. 10 and 11 may be used to predict the building load 1204 in a future time domain 1208 based on the past actual load 1202. Based on the prediction, an ESS may reduce peaks during demand windows by systematically discharging and charging a battery as shown by a battery charge state 1206.

In some embodiments, each load and generation system in an electrical system can be predicted separately. In other embodiments, all loads and generation can be combined into a single unadjusted net power that can be predicted as one variable. In other embodiments, some loads and generators can be combined and predicted as one variable, and others can be predicted as separate variables.

Simulation of Demand Setpoint in the Future Time Domain

The update demand setpoint sub-process 901b of FIG. 900 simulates the operation of the electrical system over the future time domain using a setpoint. Simulating the future time domain with an applied setpoint can be accomplished in many ways and employ many techniques. For example, in some embodiments, the simulation may include techniques from the field of numerical analysis. Examples of simulation interfaces and processes are illustrated in FIGS. 13A, 13B, and 14 as described below.

Figure 13A:
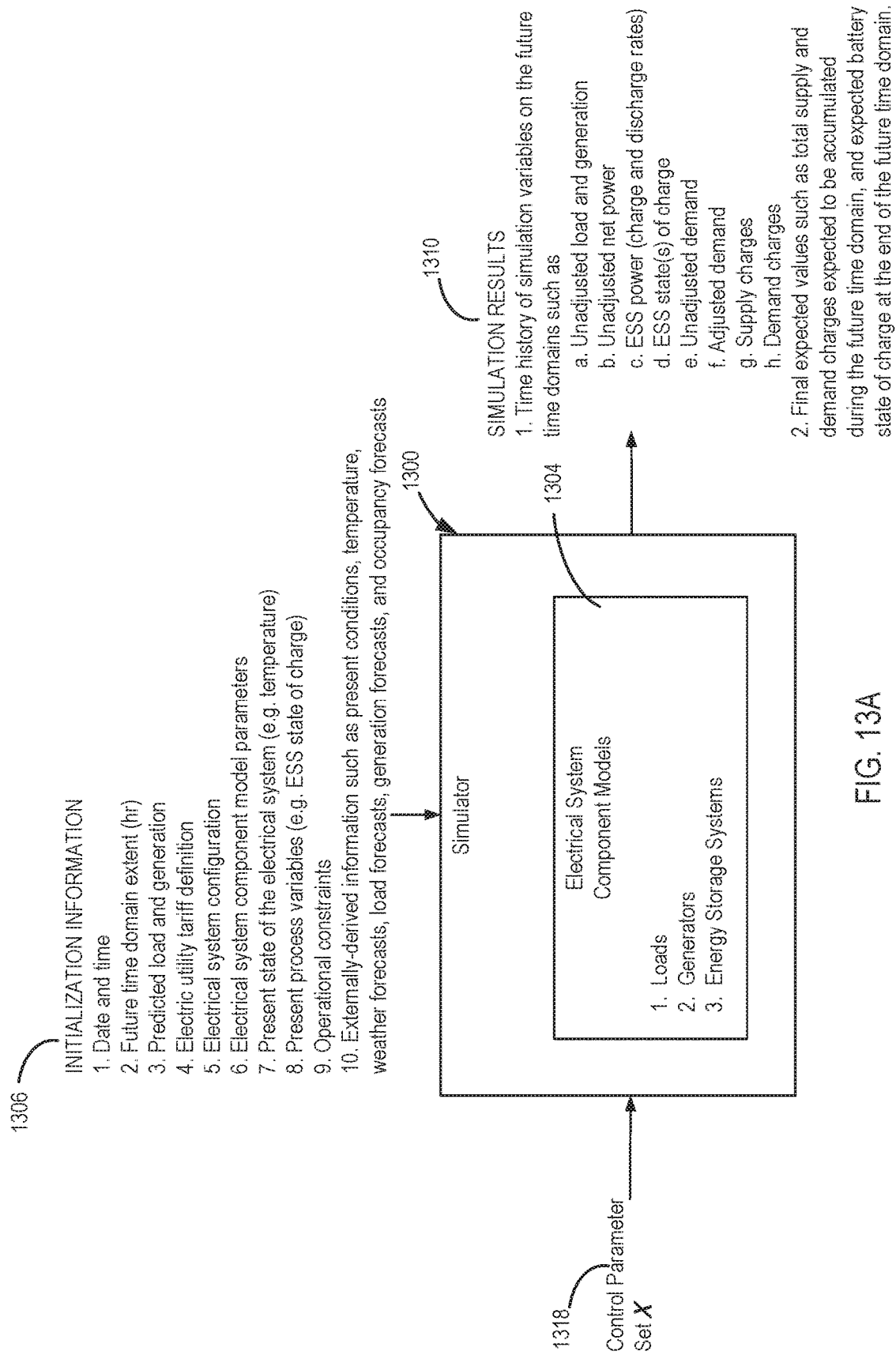
FIG. 13A is a diagrammatic representation of a demand setpoint simulator that simulates the operation of the electrical system over a future time domain with a control parameter set X, according to one embodiment of the present disclosure.
Figure 14:
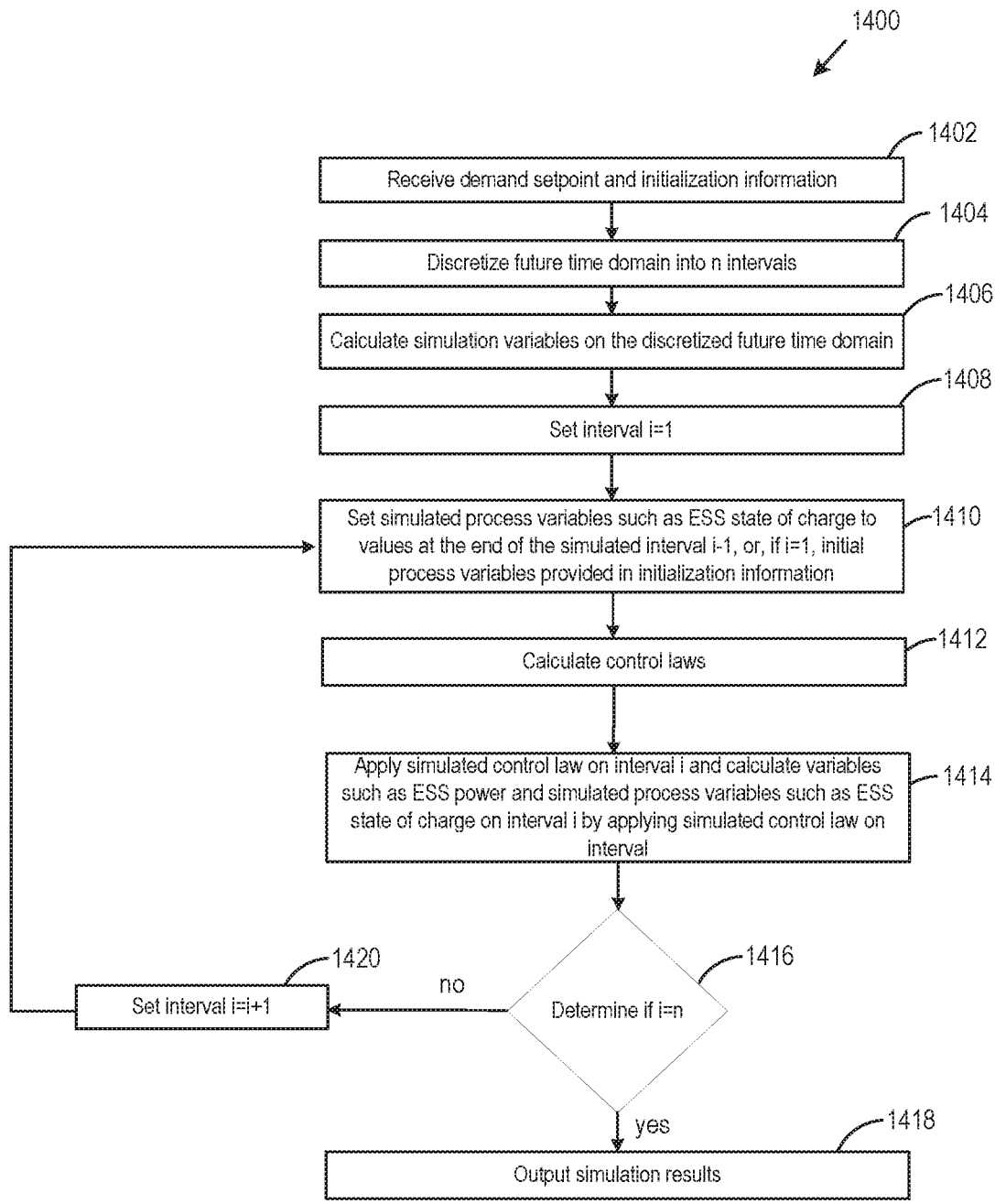
FIG. 14 is a flow diagram of a method for simulating operation of an electrical system during a future time domain with an applied demand setpoint, according to one embodiment of the present disclosure.

FIG. 13A is a diagrammatic representation of a demand setpoint simulator 1300 that simulates the operation of the electrical system over a future time domain with a control parameter set X 1318. A set may include one or more variables. The control parameter set X 1318 may comprise variables that may be altered to maintain a desired setpoint or other constraints. For example, the control parameter set X 1318 may include a global constraint, such as a zero net export variable that does not allow net energy consumption to fall below zero. The zero net export variable would prevent exporting of power. In some embodiments, the zero net export variable could be removed during specific time periods.

Other global constraints may include an upper and a lower bound for the systems energy consumption. The lower bound may prevent or control the net export. The lower bound may also be set above zero or equal to the upper bound. Raising the lower bound above zero may cause the battery to charge when the energy consumption falls below the lower bound. In some embodiments, the lower bound may be based partially on the battery state of charge. For example, if the battery is full, the lower bound is set to zero, and if the battery falls to a threshold state of charge the lower bound may be increased. Details regarding initialization information 1306, simulation results 1310, and electrical system component models 1304 will be described with reference to FIG. 13B.

Figure 13B:
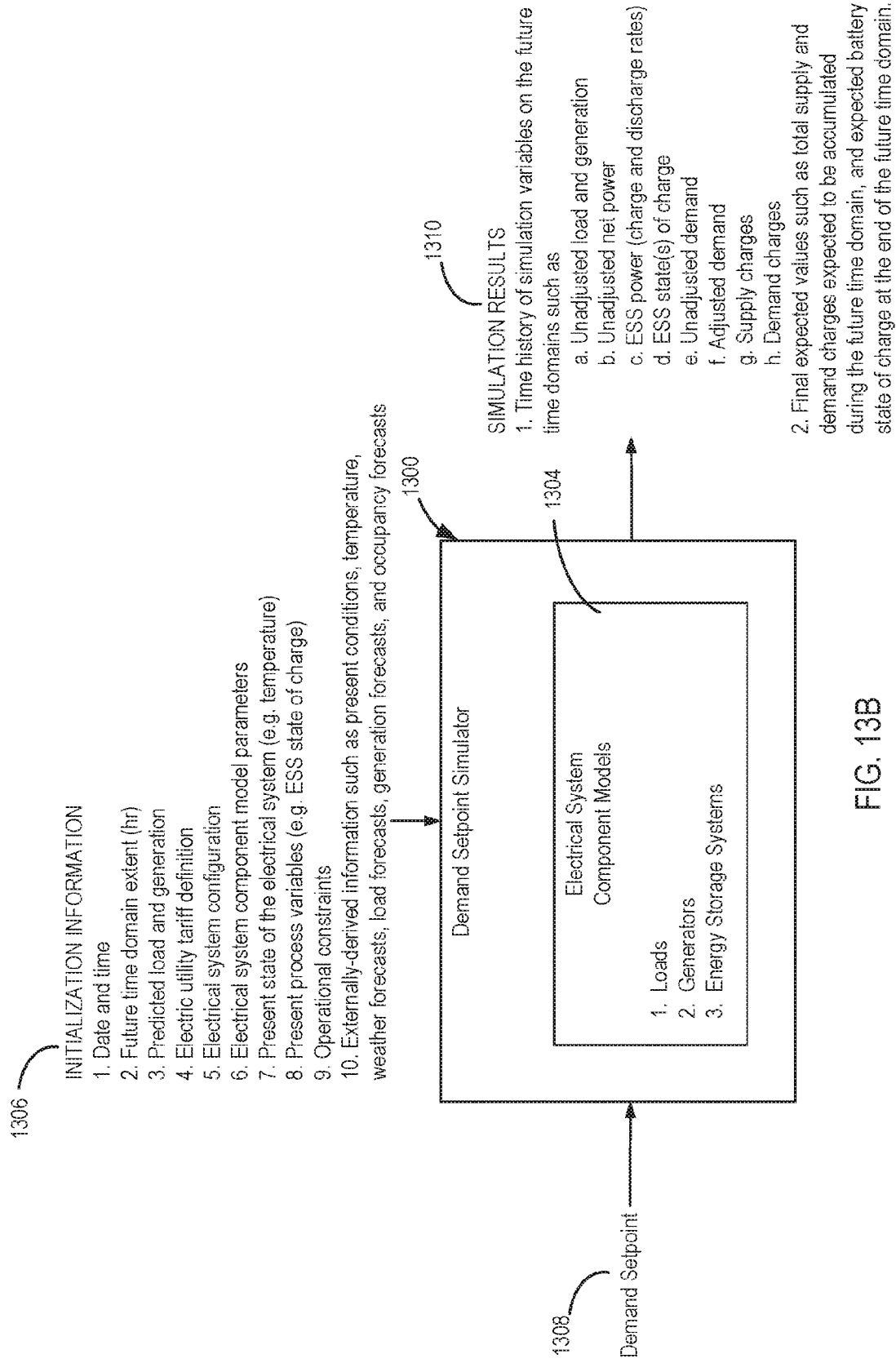
FIG. 13B is a diagrammatic representation of a demand setpoint simulator wherein the control parameter set X comprises a demand setpoint, according to one embodiment of the present disclosure.

FIG. 13B is a diagrammatic representation of a demand setpoint simulator 1300 that simulates the operation of the electrical system over a future time domain with an applied demand setpoint 1308. In this embodiment, the input control parameter set X comprises the demand setpoint 1308. The demand setpoint simulator 1300 includes models 1304 for one or more electrical system components (e.g., loads, generators, ESSs). The demand setpoint simulator 1300 receives as inputs initialization information 1306 and the demand setpoint 1308. The demand setpoint simulator 1300 provides simulation results 1310 representing simulation results of operating the electrical system during the future time domain with the applied demand setpoint 1308.

Simulation variables and process variables (such as ESS power, supply charge, battery state of charge, adjusted demand, etc.) can be stored in memory for discrete periods of time in the future time domain. For example, as shown, the simulation results 1310 may include a time history of the simulation variables during the future time domains. These simulation variables may include unadjusted load and generation, unadjusted net power, ESS power (charge and discharge rates), ESS states of charge, unadjusted demand, and adjusted demand. These simulation variables and process variables can be provided in the simulation results 1310. The simulation results 1310 can also include accumulations or totals of simulation variables. One example of a simulation result 1310 is the battery state of charge at the end of the future time domain. The simulation results 1310 are incorporated in the control parameter set by the demand setpoint resolver process.

Prior to using the demand setpoint simulator 1300, several elements of it can be initialized. The initialization information that is provided in one embodiment is:

Date and time. For determining the applicable electric utility rates.

Future time domain extent. For defining the time extent of the cost calculation.

Predicted load and power generation during the future time domain.

Electric utility tariff definition. This is a set of parameters that defines how the electrical utility calculates charges.

Electrical system configuration. These configuration elements specify the sizes and configuration of the components of the electrical system. An example for a battery energy storage system is the energy capacity of the energy storage device.

Electrical system component model parameters. These model parameters work in conjunction with analytic or numerical models to describe the physical and electrical behavior and relationships governing the operation of electrical components in the electrical system. For battery energy storage systems, a "battery model" is a component, and these parameters specify the properties of the battery such as its Ohmic efficiency, Coulombic efficiency, and degradation rate as a function of its usage.

Present state of the electrical system. This may include the current operating temperature.

Present process variables. For battery energy storage systems, one example state is the SoC of the energy storage device.

Operational constraints. This information specifies any additional operational constraints on the electrical system such as minimum import power.

Externally-derived information such as present conditions, temperature, weather forecasts, load forecasts, generation forecasts, and occupancy forecasts.

In some embodiments, a battery model may provide additional examples of information to be considered by the simulation, including:

Battery capacity (kWh or Ah)
Battery voltage
Battery efficiency as a function of charge and discharge rate
Battery capacity change as a function of charge and discharge rate
Minimum battery state of charge
Maximum battery state of charge
Whether the battery should charge when the demand setpoint exceeds the unadjusted net power. For example, the battery may be charged during periods where the energy consumption of the load is below the demand setpoint.

In some embodiments, the battery model may be provided in configuration information, as external inputs, or from other sources.

The battery model may provide Ohmic efficiency as a function of state of charge, discharge rate, and temperature, and Coulombic efficiency as function of state of charge, discharge rate, and temperature. These relationships can be provided to the demand setpoint simulator 1300 in a wide variety of forms including analytic formulas, lookup tables, and parameters of an analytic or empirical model. In one specific embodiment, Ohmic efficiency and Coulombic efficiency are determined from manufacturer data and stored as 1-, 2-, or 3-dimensional matrices. The demand setpoint simulator 1300 can then determine any value of Ohmic efficiency or Coulombic efficiency by doing a multivariable interpolation using the stored matrices. Other information a battery model may provide includes maximum charge and discharge rate (power) as a function of state of charge and temperature.

FIG. 14 is a flow diagram of a method 1400 for simulating operation of an electrical system during a future time domain with an applied demand setpoint. The method 1400 may be performed by a computer-implemented process executed by one or more computing devices, such as a demand setpoint simulator (e.g., the demand setpoint simulator 1300 of FIG. 13).

The demand setpoint simulator may receive 1402 a demand setpoint and initialization information. In some embodiments, the demand setpoint may be a current demand setpoint used by the electric system to an initial estimate based on historic setpoints. In some estimate the setpoint is low or zero to ensure that the setpoint is not overestimated by the method 1400.

In embodiment, the method 1400 breaks up the future time domain (or e.g., discretize 1404) into smaller contiguous time intervals, the discretized 1404 portions including interval one through n. Simulation variables may be calculated 1406 on the discretized 1404 future time domain. Simulation variables may include a predicted load and generation for each discretized portion of the future time domain. An interval variable may be set 1408 to one representing a first time interval. If the interval is not the initial interval, the process variables from the end of the first interval can be taken as the initial condition for the second interval, and the control laws and governing equations for the physical and electrical processes of the electrical system can be solved again for subsequent time intervals.

Process variables are determined and set 1410 at the beginning of the first time interval. Then, the control variables and laws and governing equations for the physical and electrical processes of the electrical system can be solved 1412 numerically for the first time interval. The control laws specify how to determine the control variables from X and the process variables. Stated another way, the control law enforces the definition of X. For example, for a control parameter set X defined such that a particular element, Xi, is an upper bound on demand to be applied at the present time, the control law may compare process variables such as the unadjusted demand to Xi. If unadjusted building demand exceeds Xi, the control law may respond with a command (in the form of a control variable) to instruct the ESS to discharge at a rate that will make the adjusted demand equal to or less than Xi.

During the simulation method 1400, simulation variables and process variables (such as ESS power, supply charge, battery state of charge, adjusted demand, etc.) can be calculated 1414 and stored in memory for each interval. To calculate 1414 the variables, a control law may be applied to the current state of the system during interval i. For example, the method 1400 may propagate a physical equation that governs battery SOC to determine the discharge rate and get new battery state of charge.

The simulation variables and process variables can be output 1418 in the simulation results. Simulation results can also include accumulations or totals of simulation variables. One example of a simulation result is the battery state of charge at the end of the future time domain.

The method 1400 determines 1416 if the current interval is the last interval. If the current interval is not the last interval, the interval is increased 1420 by one and the next interval is simulated. When the interval is the last interval, the simulation results are output 1418.

Figure 15:
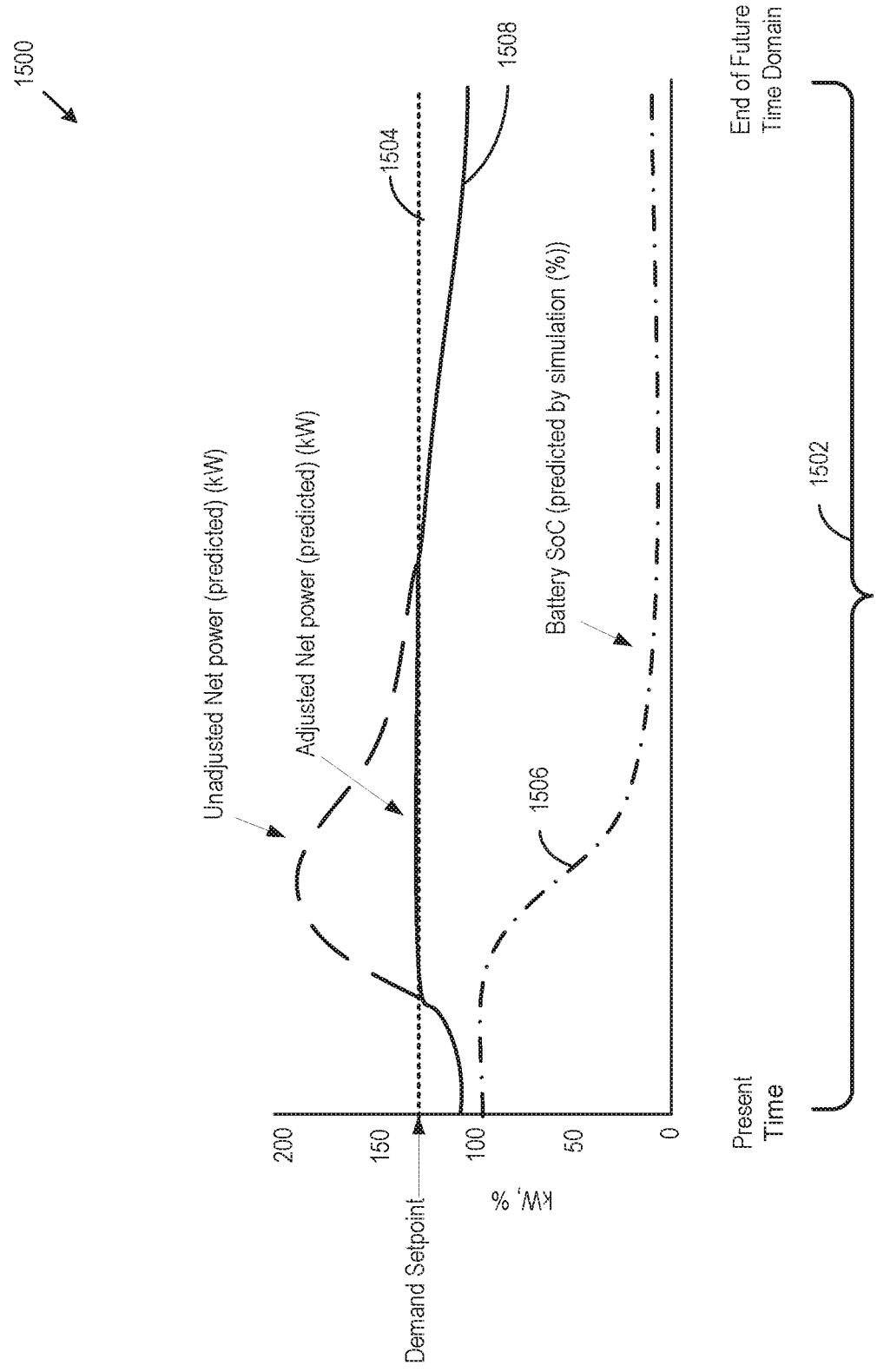
FIG. 15 is a graph showing plots for an example simulation of operation of an electrical system with a demand setpoint applied in the future time domain

FIG. 15 is a graph 1500 showing plots for an example simulation of operation of an electrical system with a demand setpoint 1504 applied in a future time domain 1502. As shown, a battery SoC 1506 decreases to maintain an adjusted net power 1508 at the demand setpoint 1504. In this example, the expected battery SoC 1506 is slightly greater than zero.

In one embodiment, the expected battery SoC 1506 at the end of the future time domain 1502 can be compared to the minimum battery state of charge. If the expected battery SoC 1506 at the end of the future time domain 1502 is less than or equal to the minimum battery state of charge, the demand setpoint 1504 can be increased. The amount of the increase in one example can be 1% of the maximum ESS power. The demand setpoint 1504 can also be increased by a different amount, based on a formula that considers the difference between the expected battery state of charge at the end of the future time domain 1502 and the minimum battery state of charge.

If the expected battery SoC 1506 at the end of the future time domain 1502 is less than or equal to the minimum battery state of charge and the demand setpoint 1504 is increased, a demand setpoint resolver can repeat the simulation, and determine if the demand setpoint 1504 should be further increased. This sequence can be repeated until the expected battery SoC 1506 at the end of the future time domain 1502 is greater than the minimum battery state of charge. Once the expected battery state of charge at the end of the future time domain 1502 exceeds the minimum battery state of charge, the demand setpoint controller can incorporate the demand setpoint 1504 into the control parameter set.

The High Speed Controller

The charge control mode and demand control mode, as described in FIGS. 5-6, utilize a HSC. The HSC may be different for each mode, or both modes may use the same HSC.

Figure 16:
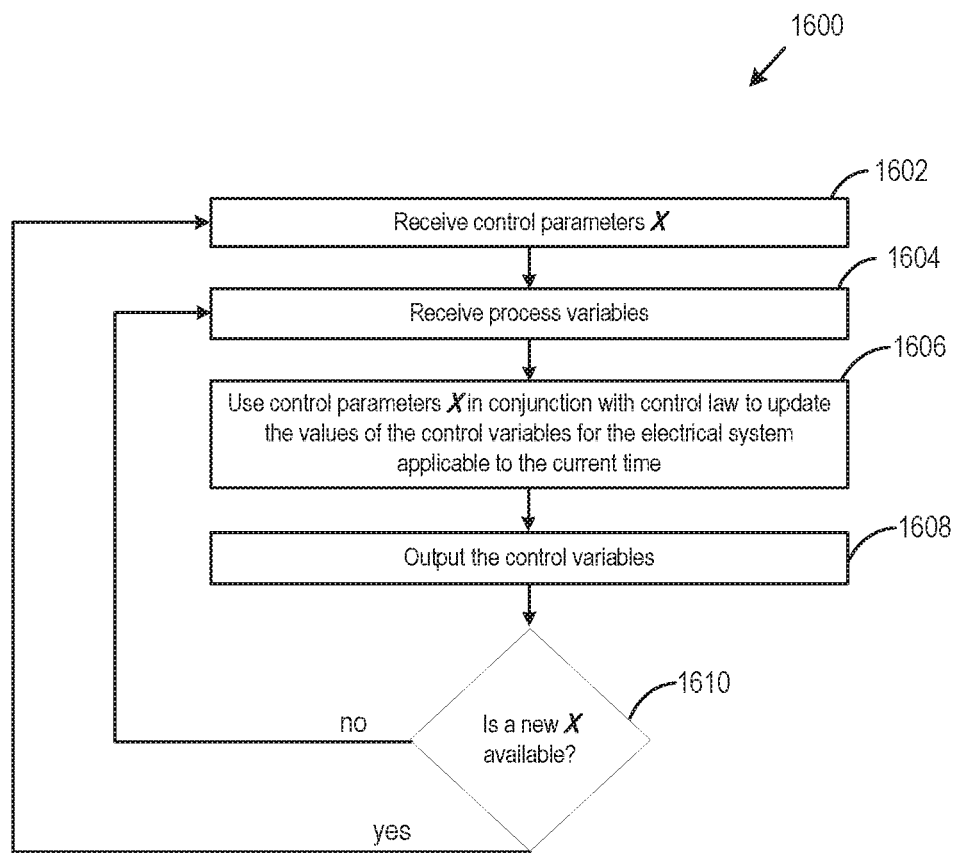
FIG. 16 illustrates a method that a HSC may use to output control variables, according to one embodiment of the present disclosure.

FIG. 16 illustrates a method 1600 that a HSC may use to output control variables, according to one embodiment. The HSC receives 1602 a set of control parameters X. The HSC also receives 1604 a set of process variables. The HSC continuously updates 1606 the output control variables subject to a set of predefined control laws while observing the set of process variables in one embodiment. The control variables are output 1608 to an electrical system to control certain components.

Because the control parameters comprising X are passed to the HSC, the definition of the control parameters is tightly linked to the HSC's law in one embodiment. For example, in one example embodiment, a task of the HSC is to control some or all of the electrical system components within the electrical system based on the currently-applicable control parameter set. The HSC can continue to control these components until a new set of control parameters is received 1610.

The time between receiving control parameters can be called a "time segment." In some embodiments, a battery energy storage system may have a rate at which the process variables are read and used by the HSC and new control variables are generated from 10 times per second to once per 15 minutes.

Defining or updating 1606 the control parameter set X involves defining or otherwise specifying times at which each control parameter is to be applied during a future time domain, and the control law(s) that are to be applied at each time in the future time domain.

One embodiment of a HSC for battery energy storage systems uses four parameters for each time segment. Each of the four parameters is defined in Table 1. In one embodiment, these parameters are used by the HSC to control the battery inverter to charge or discharge the energy storage. While there are many ways to define a control parameter set X, three possible approaches are:

1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 1.

TABLE 1

| Parameter | Description | Example Value |
|---|---|---|
| $P_{nom}$ | Nominal ESS power (or discharge power if negative) to be applied in the absence of other constraints or rules (such as those related to UB, $UB_0$, or LB below). | −10 W |
| UB | Upper bound on adjusted demand (e.g., an upper setpoint). Not to be exceeded unless the ESS is incapable of discharging at sufficient power. | 100 kW |
| $UB_0$ | Upper bound on electrical system adjusted demand (e.g., an upper setpoint) not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import," or, if 0, "zero export." Adjusted net power will be kept above this value unless the ESS is incapable of charging at sufficient power and generators cannot be throttled sufficiently. | 0 kW |

In one embodiment of a HSC with the parameter set shown in Table 1, the parameter UB can be set equal to the demand setpoint. In some embodiments, the parameter $UB_0$ may be set to a demand setpoint.

Another aspect of the HSC in one disclosed embodiment is that it can also be used to curtail a generator (such as a photovoltaic generator) if necessary to maintain the lower bound on electrical system power consumption specified by LB.

In some embodiments, the parameter set may have fewer or more parameters than the four. For example, some embodiments may include only three parameters: $P_{nom}$, UB, and LB. Alternately, some embodiments may include only two parameters: $P_{nom}$ and UB. Alternately, some embodiments may include only UB or only $P_{nom}$ or any other combination of four or fewer parameters from the above list.

Figure 17:
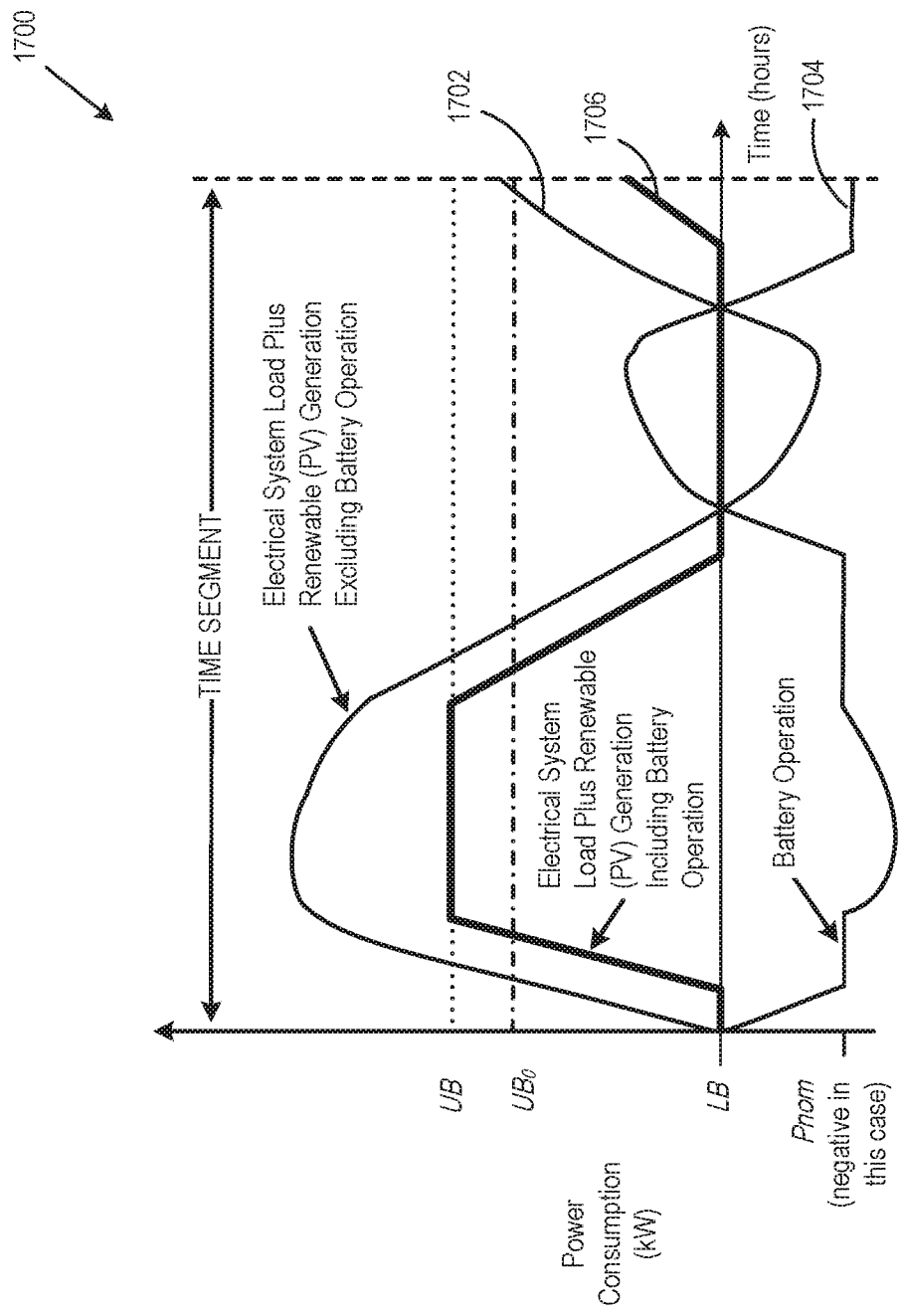
FIG. 17 is a graph showing plots for an example of application of a particular four-parameter control set during a time segment.

FIG. 17 is a graph 1700 showing plots for an example of application of a particular four-parameter control set during a time segment. The graph 1700 shows a value for each of UB, $UB_0$, LB, and $P_{nom}$, which are defined above in Table 1. A vertical axis is the power consumption (or rate of energy consumed), with negative values being generative. A first plot 1702 provides unadjusted values of power consumption (kW) for the electrical system load plus renewable (photovoltaic) generation and excluding battery operation, over the time segment. In other words, the first plot 1702 shows operation of the electrical system without benefit of a controllable ESS (battery) that is controlled by a controller, according to the present disclosure. A second plot 1704 provides values of power consumption (kW) for battery operation over the time segment. The second plot 1704 may reflect operation of an ESS as commanded by the controller. In other words, the second plot 1704 is the control variable for the ESS. The battery operation value may be the value of the control variable to be provided by the HSC to command operation of the ESS. A third plot 1706 provides values of power consumption (kW) for the electrical system load plus renewable (photovoltaic) generation and including battery operation, over the time segment. The third plot 1706 illustrates how the controlled ESS (or battery) affects the power consumption of the electrical system from the grid. Specifically, the battery in this example is controlled (e.g., by the battery operation value) to discharge to reduce the load of the electrical system on the grid and limit peak demand to the UB value when desired. Furthermore, this example shows LB being enforced by commanding the ESS to charge by an amount that limits the adjusted net power to be no less than LB when necessary. Furthermore, this example shows that the nominal ESS power (Pnom) is commanded to the extent possible while still meeting the requirements of UB, $UB_0$, and LB.

In other embodiments, the control parameter set X may have fewer or more parameters than the four described for the example embodiment above. For example, the control parameter set X may be comprised of only three parameters: Pnom, UB, and LB. Alternately, the control parameter set X may be comprised of only two parameters: Pnom and UB. Alternately, the control parameter set X may include only of UB or only of Pnom. Or, it may include any other combination of four or fewer parameters from the above list.

Examples Scenarios

Figure 18:
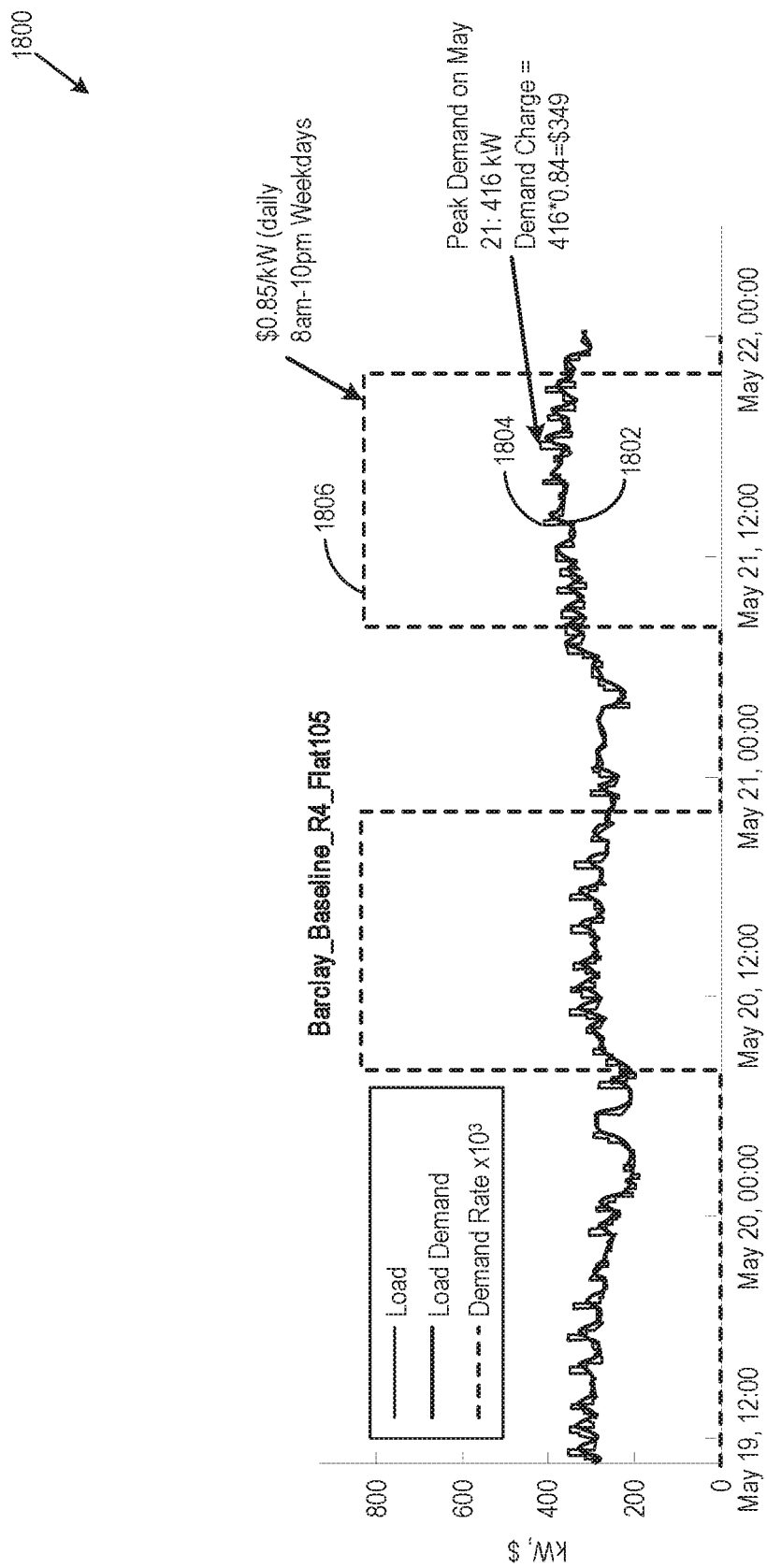
FIG. 18 is a graph illustrating how demand charges impact energy costs of a customer.

FIG. 18 is a graph 1800 illustrating how demand charges impact energy costs of a customer. Demand charges are electrical distribution charges that customers pay based on their maximum demand (kW) during a specified window of time. The graph 1800 includes a plot 1802 of the load and a plot 1804 of the demand. The graph 1800 also includes a plot 1806 of the demand rate. Demand charges are typically calculated monthly but can also be daily. The maximum is often only taken for certain hours of the day. In the illustrated embodiment, a daily demand rate from 8:00 am to 10:00 pm on weekdays is $0.84/kW (daily). The peak demand on May 21 is 416 kW. Accordingly the Demand Charge=416*0.84=$349.

Figure 19:
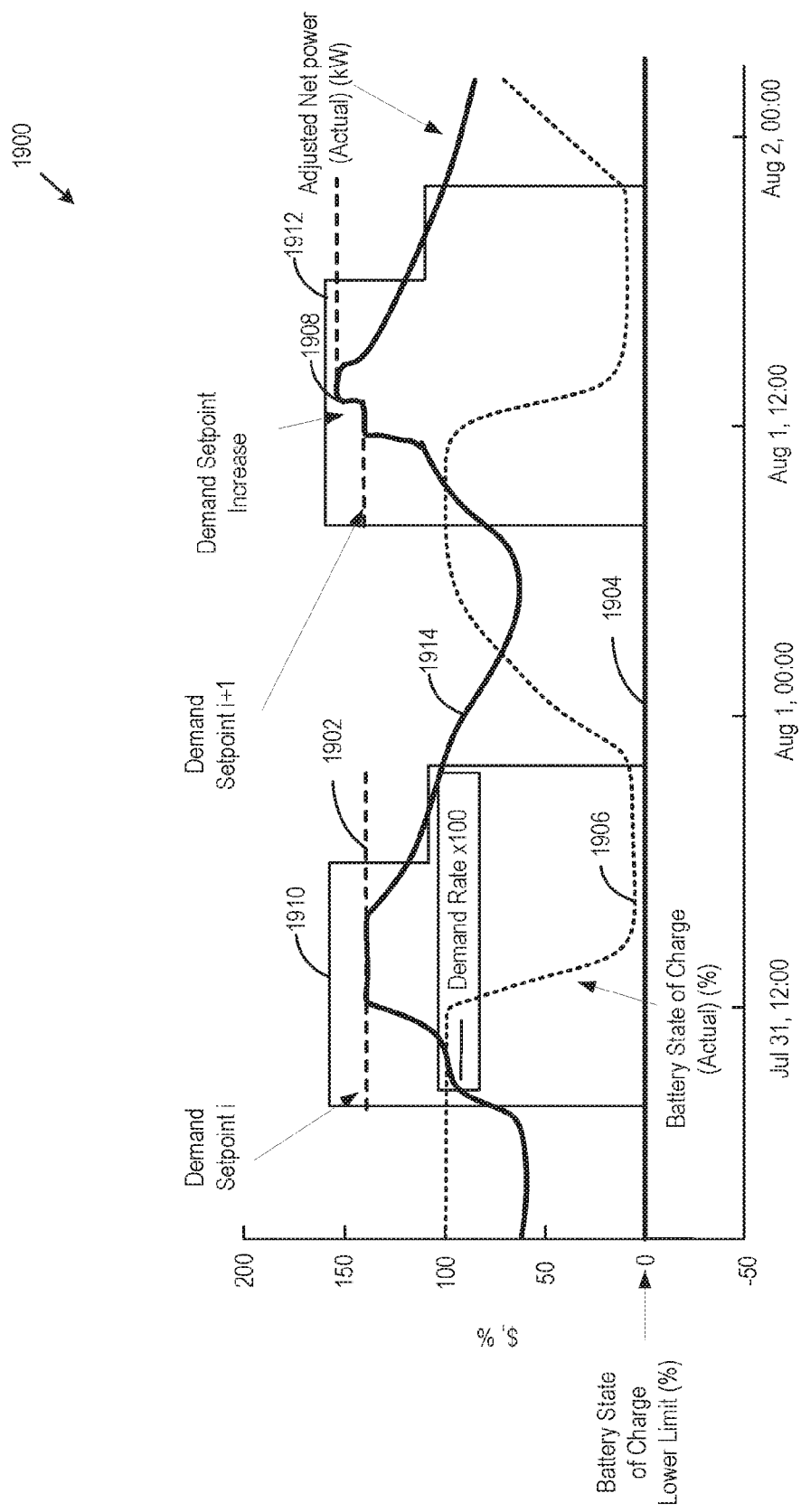
FIG. 19 is a graph showing an example of demand charge controller operating over approximately two days to reduce demand charges using setpoints.

FIG. 19 is a graph 1900 showing an example of demand charge controller operating over approximately two days to reduce demand charges using setpoints 1902. In this example, the demand setpoint controller determines the demand setpoint such that the battery state of charge 1906 does not drop below its lower limit 1904 (e.g., 0%) when in demand control mode. In this example, the parameter UB is set equal to the demand setpoint 1902.

As shown, in some embodiments, the setpoint 1902 may be increased so that the battery state of charge does not drop below its lower limit (e.g., demand setpoint increase 1908). The demand setpoint 1902 during the charge periods may be set to HIGH (near infinity). Therefore, these setpoints are not shown because they are off the scale of the graph during the charge periods (e.g., periods between demand windows 1910, 1912).

In some embodiments, as shown, the battery state of charge 1906 may increase after the demand windows 1910, 1912 end. However, in some embodiments, the batteries of an ESS may charge whenever the adjusted ent power 1914 falls below the demand setpoint 1902.

Apparatus Architectures

Figure 20:
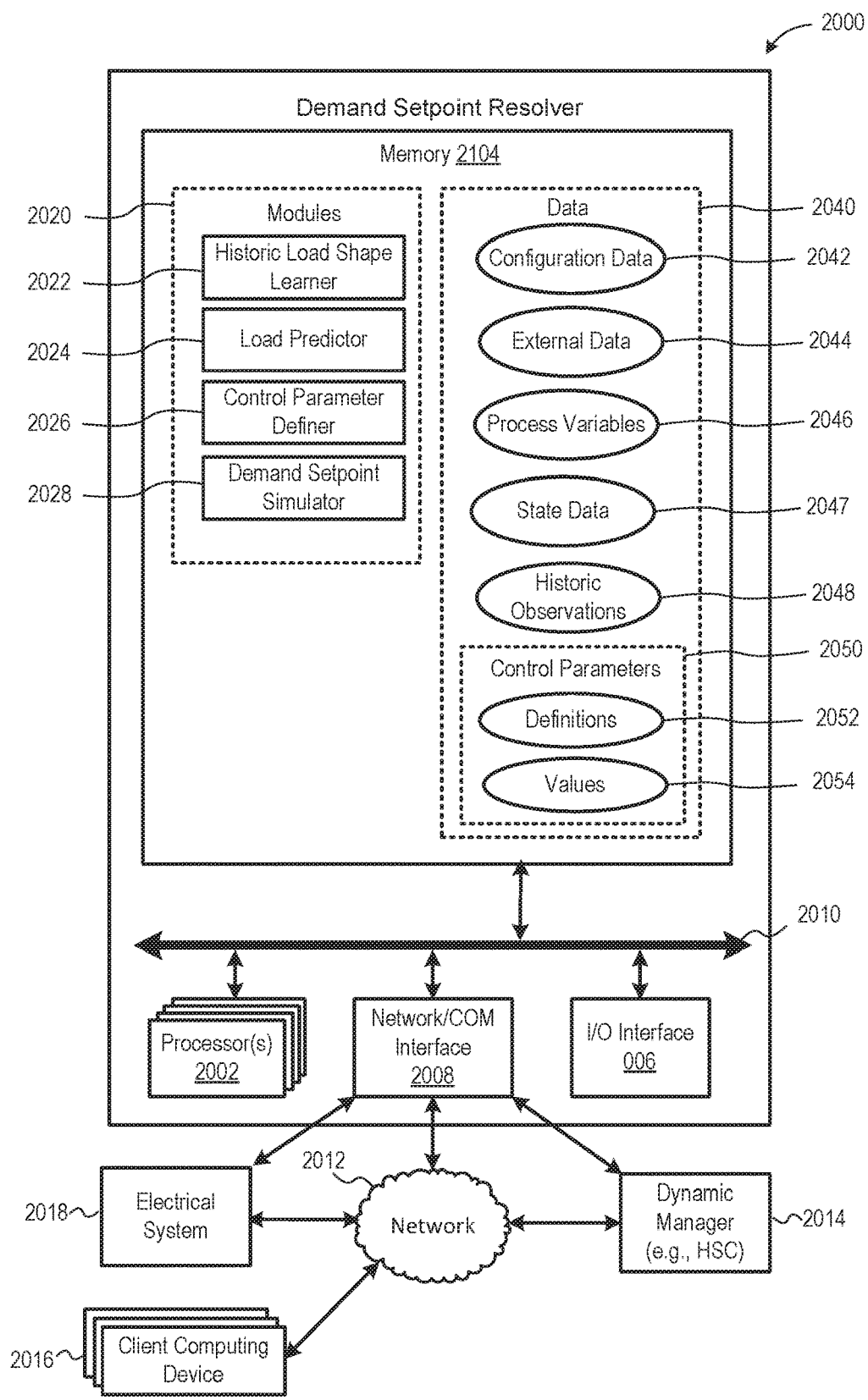
FIG. 20 is a diagram of a demand setpoint resolver, according to one embodiment of the present disclosure.

FIG. 20 is a diagram of an demand setpoint resolver 2000 according to one embodiment of the present disclosure. The demand setpoint resolver 2000 may determine a control plan for managing control of an electrical system 2018 during an upcoming time domain and provide the control plan as output. The determined control plan may include a demand setpoint and a plurality of sets of parameters each to be applied for a different time segment within an upcoming time domain. The demand setpoint resolver 2000 may determine the control plan based on a set of configuration elements specifying one or more constraints of the electrical system 2018 and defining one or more demand windows associated with operation of the electrical system. The demand setpoint resolver 2000 may also determine the control plan based on a set of process variables that provide one or more measurements of a state of the electrical system 2018. The demand setpoint resolver 2000 may include one or more processors 2002, memory 2004, an input/output interface 2006, a network/COM interface 2008, and a system bus 2010.

The one or more processors 2002 may include one or more general purpose devices, such as an Intel®, AMD®, or other standard microprocessor. The one or more processors 2002 may include a special purpose processing device, such as ASIC, SoC, SiP, FPGA, PAL, PLA, FPLA, PLD, or other customized or programmable device. The one or more processors 2002 perform distributed (e.g., parallel) processing to execute or otherwise implement functionalities of the present embodiments. The one or more processors 2002 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 2004 may include static RAM, dynamic RAM, flash memory, one or more flip-flops, ROM, CD-ROM, DVD, disk, tape, or magnetic, optical, or other computer storage medium. The memory 2004 may include a plurality of program modules 2020 and a data 2040.

The program modules 2020 may include all or portions of other elements of the demand setpoint resolver 2000. The program modules 2020 may run multiple operations concurrently or in parallel by or on the one or more processors 2002. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 2004 may also include the data 2040. Data generated by the demand setpoint resolver 2000, such as by the program modules 2020 or other modules, may be stored on the system memory 2004, for example, as stored program data 2040. The data 2040 may be organized as one or more databases.

The input/output interface 2006 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2008 may facilitate communication or other interaction with other computing devices (e.g., a dynamic manager 2014) and/or networks 2012, such as the Internet and/or other computing and/or communications networks. The network/COM interface 2008 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2008 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 2008 may be any appropriate communication interface for communicating with other systems and/or devices.

The system bus 2010 may facilitate communication and/or interaction between the other components of the system, including the one or more processors 2002, the memory 2004, the input/output interface 2006, and the network/COM interface 2008.

The modules 2020 may include a historic load shape learner 2022, a load predictor 2024, a control parameter definer 2026, and a demand setpoint simulator 2028.

The historic load shape learner 2022 may compile or otherwise gather historic trends to determine a historic profile or an average load shape that may be used for load prediction. The historic load shape learner 2022 may determine and update and an avg_load_shape array and an avg_load_shape_time_of_day array by recording load observations and using an approach to determine a suitable average of the historic load observations after multiple periods of time. The historic load shape learner 2022 may utilize a process or an approach to determining the historic average profile such as described above with reference to FIG. 10. The load predictor 2024 may predict a load on the electrical system 2018 during an upcoming time domain. The load predictor 2024 may utilize a historic profile or historic load observations provided by the historic load shape learner 2022. The load predictor 2024 may utilize a load prediction method such as described above with reference to FIGS. 10 and 11.

The control parameter definer 2026 may generate, create, or otherwise define a control parameter set X, in accordance with a control law. The created control parameters 2050 may include a definition 2052 and a value 2054 and may be stored as data 2040.

The Demand setpoint simulator cost function preparer/initializer 2028 updates a demand setpoint based on a simulation process. The demand setpoint simulator simulates at least one demand setpoint to predict if the setpoint can be maintained during a future time domain. If the demand setpoint cannot be maintained, the demand simulator may recursively increase the demand setpoint and simulate increased demand setpoint.

The data 2040 may include configuration data 2042, external data 2044, process variables 2046, state data 2047, historic observations 2048, and control parameters 2050 (including definitions 2052 and values 2054).

The configuration data 2042 may be provided to, and received by, the demand setpoint resolver 2000 to communicate constraints and characteristics of the electrical system 2018.

The external data 2044 may be received as external input (e.g., weather reports, changing tariffs, fuel costs, event data), which may inform the determination of the optimal set of values.

The process variables 2046 may be received as feedback from the electrical system 2018. The process variables 2046 are typically measurements of the electrical system 2018 state and are used to, among other things, determine how well objectives of controlling the electrical system 2018 are being met.

The state data 2047 would be any demand setpoint resolver state information that may be helpful to be retained between one demand setpoint resolver iteration and the next. An example is avg_load_shape.

The historic observations 2048 are the record of process variables that have been received. A good example is the set of historic load observations that may be useful in a load predictor algorithm.

As noted earlier, the control parameter definer may create control parameters 2050, which may include a definition 2052 and a value 2054 and may be stored as data 2040.

The demand setpoint resolver 2000 may provide one or more control parameters 2050 as a control parameter set X to the dynamic manager 2014 via the network/COM interface 2008 and/or via the network 2012. The dynamic manager 2014 may then utilize the control parameter set X to determine values for a set of control variables to deliver to the electrical system 2018 to effectuate a change to the electrical system 2018 toward meeting one or more objectives (e.g., improved economic operation) for controlling the electrical system 2018.

In other embodiments, the demand setpoint resolver 2000 may communicate the control parameter set X directly to the electrical system 2018 via the network/COM interface 2008 and/or via the network 2012. In such embodiments, the electrical system 2018 may process the control parameter set X directly to determine control commands, and the dynamic manager 2014 may not be included.

In still other embodiments, the demand setpoint resolver 2000 may determine values for a set of control variables (rather than for a control parameter set X) and may communicate the set of values for the control variables directly to the electrical system 2018 via the network/COM interface 2008 and/or via the network 2012.

One or more client computing devices 2016 may be coupled via the network 2012 and may be used to configure, provide inputs, or the like to the demand setpoint resolver 2000, the dynamic manager 2014, and/or the electrical system 2018.

Figure 21:
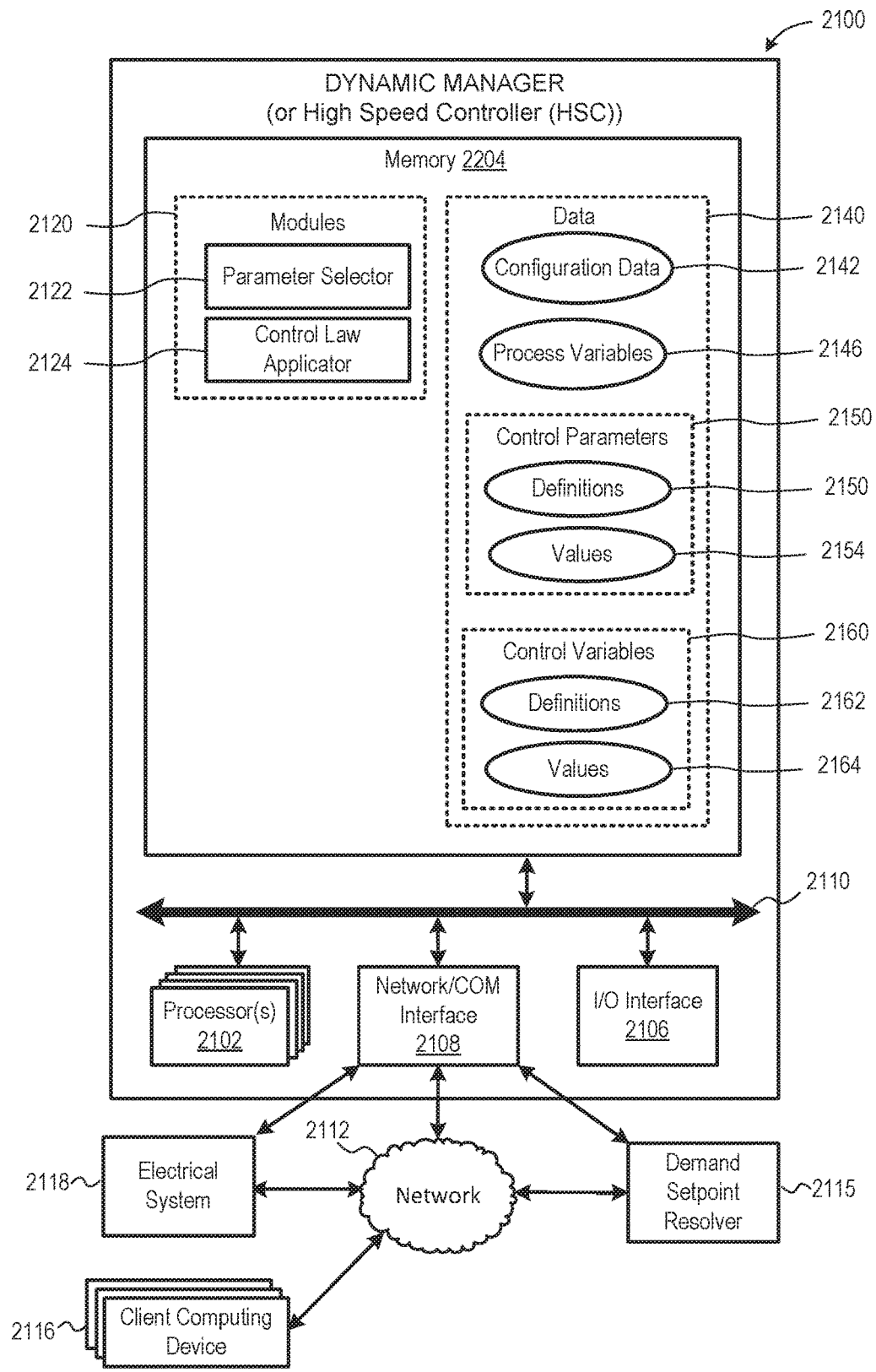
FIG. 21 is a diagram of a dynamic manager, according to one embodiment of the present disclosure.

FIG. 21 is a diagram of a dynamic manager 2100, according to one embodiment of the present disclosure. The dynamic manager 2100, according to one embodiment of the present disclosure, is a second computing device that is separate from a demand setpoint resolver 2115, which may be similar to the demand setpoint resolver 2100 of FIG. 21. The dynamic manager 2100 may operate based on input (e.g., a control parameter set X) received from the demand setpoint resolver 2115. The dynamic manager 2100 may determine a set of control values for a set of control variables for a given time segment of the upcoming time domain and provide the set of control values to an electrical system 2118 to effectuate a change to the electrical system 2118 toward meeting an objective (e.g., more economical operation) of the electrical system 2118 during an upcoming time domain. The dynamic manager 2100 determines the set of control values based on a control law and a set of values for a given control parameter set X. The dynamic manager 2100 may include one or more processors 2102, memory 2104, an input/output interface 2106, a network/COM interface 2108, and a system bus 2110.

The one or more processors 2102 may include one or more general purpose devices, such as an Intel®, AMD®, or other standard microprocessor. The one or more processors 2102 may include a special purpose processing device, such as ASIC, SoC, SiP, FPGA, PAL, PLA, FPLA, PLD, or other customized or programmable device. The one or more processors 2102 perform distributed (e.g., parallel) processing to execute or otherwise implement functionalities of the present embodiments. The one or more processors 2102 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 2104 may include static RAM, dynamic RAM, flash memory, one or more flip-flops, ROM, CD-ROM, DVD, disk, tape, or magnetic, optical, or other computer storage medium. The memory 2104 may include a plurality of program modules 2120 and a program data 2140.

The program modules 2120 may include all or portions of other elements of the dynamic manager 2100. The program modules 2120 may run multiple operations concurrently or in parallel by or on the one or more processors 2102. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 2104 may also include data 2140. Data generated by the dynamic manager 2100, such as by the program modules 2120 or other modules, may be stored on the system memory 2104, for example, as stored program data 2140. The stored program data 2140 may be organized as one or more databases.

The input/output interface 2106 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 2108 may facilitate communication with other computing devices and/or networks 2112, such as the Internet and/or other computing and/or communications networks. The network/COM interface 2108 may couple (e.g., electrically couple) to a communication path (e.g., direct or via the network) to the electrical system 2118. The network/COM interface 2108 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 2108 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 2110 may facilitate communication and/or interaction between the other components of the system, including the one or more processors 2102, the memory 2104, the input/output interface 2106, and the network/COM interface 2108.

The modules 2120 may include a parameter selector 2122 and a control law applicator 2124.

The parameter selector may pick which set of parameters to be used from the control parameter set X, according to a given time segment.

The control law applicator 2124 may process the selected set of parameters from the control parameter set X and convert or translate the individual set of parameters into control variables (or values thereof). The control law applicator 2124 may apply logic and/or a translation process to determine a set of values for a set of control variables based on a given set of parameters (from a control parameter set X) for a corresponding time segment. For example, the control law applicator 2124 may apply a method and/or logic as shown in FIG. 16. The data 2140 may include configuration data 2142, process variables 2146, control parameters 2150 (including definitions 2152 and values 2154), and/or control variables 2160 (including definitions 2162 and values 2164).

The configuration data 2142 may be provided to, and received by, the dynamic manager 2100 to communicate constraints and characteristics of the electrical system 2118.

The process variables 2146 may be received as feedback from the electrical system 2118. The process variables 2146 are typically measurements of the electrical system 2118 state and are used to, among other things, determine how well objectives of controlling the electrical system 2118 are being met. Historic process variables 2146 may be utilized by the HSL for example to calculate demand which may be calculated as average building power over the previous 15 or 30 minutes. The dynamic manager 2100 can determine the set of control values for the set of control variables based on the process variables 2146.

The control parameters 2150 may comprise a control parameter set X that includes one or more sets of parameters each for a corresponding time segment of an upcoming time domain. The control parameters 2150 may additionally, or alternately, provide a control plan for the upcoming time domain. The control parameters 2150 may be received from a demand setpoint resolver 2115 as an optimal control parameter set $X_{opt}$.

The control variables 2160 may be generated by the parameter interpreter 2122 based on an optimal control parameter set $X_{opt}$.

The dynamic manager 2100 may receive the optimal control parameter set $X_{opt}$ from the demand setpoint resolver 2115 via the network/COM interface 2108 and/or via the network 2112. The dynamic manager 2100 may also receive the process variables from the electrical system 2118 via the network/COM interface 2108 and/or via the network 2112.

The dynamic manager 2100 may provide the values for the set of control variables to the electrical system 2118 via the network/COM interface 2108 and/or via the network 2112.

One or more client computing devices 2116 may be coupled via the network 2112 and may be used to configure, provide inputs, or the like to the demand setpoint resolver 2115, the dynamic manager 2100, and/or the electrical system 2118.

Updating Model Data and Making Predictions

Figure 22:
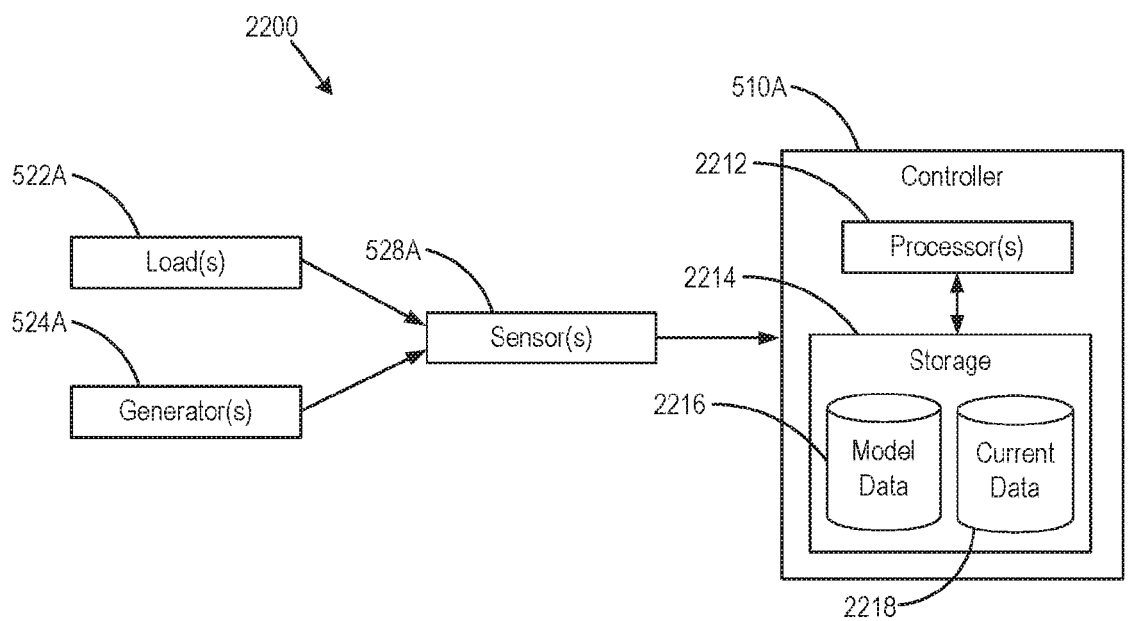
FIG. 22 is a simplified block diagram illustrating an electrical power system, according to one embodiment of the present disclosure.

As discussed above with reference to FIGS. 5-7, load and generation predictions may be used when the setpoint is evaluated for future time domains. More detail will here be discussed regarding load and generation predictions. FIG. 22 is a simplified block diagram illustrating an example of an electrical power system 500A, similar to the electrical power system 500 of FIG. 5. For example, the electrical power system 500A includes one or more loads 522A (sometimes referred to herein as "loads" 522A) operably coupled to one or more sensors 528A (sometimes referred to herein as "sensors" 528A), and a controller 510A operably coupled to the sensors 528A. In some embodiments, the electrical power system 500A may include one or more generators 524A (sometimes referred to herein as "generators" 524A) operably coupled to the sensors 528. The loads 522A, the generators 524A, the sensors 528A, and the controller 510A may be similar to the loads 522, the generators 524, the sensors 528, and the controller 510 discussed above with reference to FIG. 5.

The controller 510A includes one or more processors 2212 (sometimes referred to herein as "processors" 2212) operably coupled to one or more data storage devices 2214 (sometimes referred to herein as "storage" 2214). The storage 2214 is configured to store model data 2216 indicating, for time points of a time period of operation (e.g., one day) of the electrical power system 500A, a model load power for the loads 522A, a model generator power for the generators 524A, or a combination of the model load power and the model generator power. As used herein, the terms "model data," "model load power," and "model generator power" refer to models of typical data (e.g., data indicating typical load power consumed by the loads 522A, typical generator power provided by the generators 524A). This typical data may be produced (e.g., by the processors 2212) using actual measured data measured by the sensors 528A (e.g., average daily load/generator data), may be theoretical data provided by a user of the electrical power system 500A, theoretically estimated data based on estimated power consumption/generation, or combinations thereof. A combination of the model load power and the model generator power may comprise a "net" (e.g., summation) of the model load power and the model generator power, or may comprise a dual model with a representation or model for the model load power and a representation or model for the model generator power.

Figure 23:
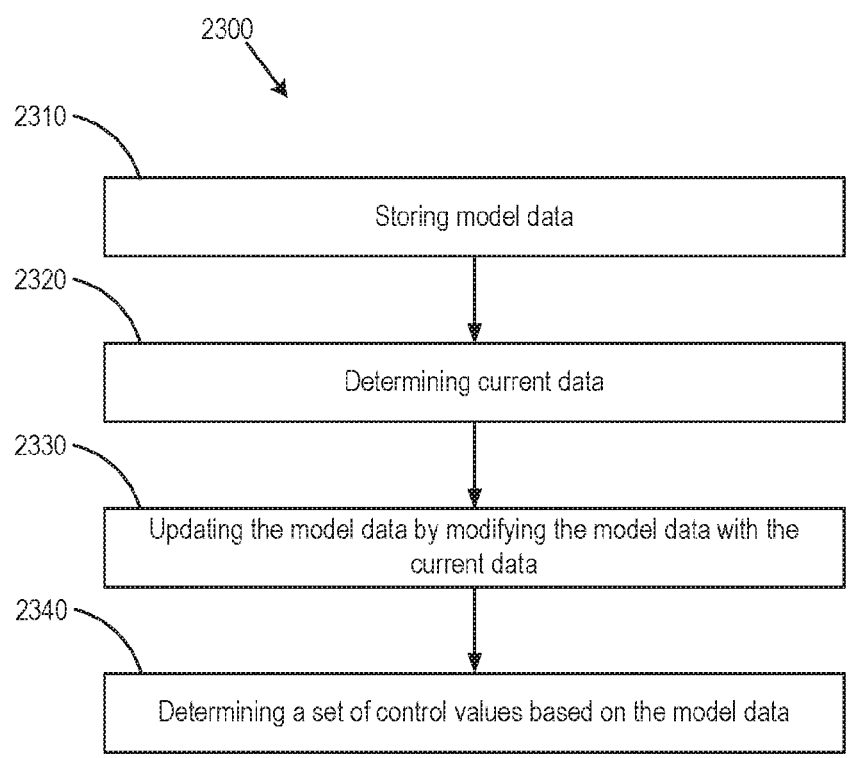
FIG. 23 is a simplified flowchart illustrating a method of operating an electrical power system, according to one embodiment of the present disclosure.

By way of non-limiting example, the processors 2212 may produce or update the model data 2216 using the method 2300 of FIG. 23.

In some embodiments, the model data 2216 includes an aggregation of a plurality of sets of previous data, each of the plurality of sets of previous data including data indicating, for time points of a different previous time period of operation of the electrical power system 500A, a previous load power consumed by the loads 522A, a previous generator power provided by the generators, or a combination of the previous load power and the previous generator power. In some embodiments, the aggregation of the plurality of sets of previous data includes an average of the plurality of sets of previous data. In some embodiments, the average of the plurality of sets of previous data includes a weighted average of the plurality of sets of previous data. In some embodiments, the model data 2216 includes a user defined estimate of a typical load power for the loads 522A, a typical generator power for the generators 524A, or a combination of the typical load power and the typical generator power for the time points of the time period. Many other methods are contemplated for generating the model data 2216. By way of non-limiting example, the model data 2216 may be generated using an output error model, AutoRegressive Moving Average (ARMA) models, other model generation techniques known in the art, or combinations thereof.

The processors 2212 are configured to determine, based on information received from the sensors, current data 2218 including a current load power consumed by the loads 522A, a current generator power provided by the generators 524A, or a combination of the current load power and the current generator power. The current data 2218 may be determined for time points of a current time period of operation of the electrical power system 500A. The current time period corresponds to the time period of the model data 2216.

The processors 2212 are also configured to modify (e.g., update) the model data 2216 by aggregating the model data 2216 with the current data 2218. In some embodiments, the processors 2212 are configured to aggregate the model data 2216 with the current data 2218 by determining a weighted average between the model data 2216 and the current data 2218. In some embodiments, the model data 2216 is weighted more heavily than the current data 2218 in the weighted average. By way of non-limiting example, an IIR filter may be used to update the model data 2216. An expression for the IIR filter may be given as follow:

$$\text{Data}_{Model}(n+1,i) = a_1 \text{Data}_{Model}(n,i) + a_2 \text{Data}_{current}(i)$$

where $\text{Data}_{Model}(n+1,i)$ is the updated model data 2216, $\text{Data}_{Model}(n,i)$ is the model data 2216 prior to being updated, $\text{Data}_{current}(i)$ is the current data 2218, and $a_1$ and $a_2$ are coefficients of the IIR filter. As a specific non-limiting example, the model data 2216 may be weighed more heavily than the current data 2218 by selecting $a_1 > a_2$ (e.g., $a_1 = 0.95$ and $a_2 = 0.05$).

With the model data 2216 weighed more heavily than the current data 2218 in updating the model data 2216, the model data 2216 may be resilient to non-recurring artifacts of any given current data 2218. If, however, the behavior of the loads 522A and/or the generators 524A manifests recurrent changes, the model data 2216 will gradually incorporate that behavior over several updates of the model data 2216. For example, if $a_1=0.95$ and $a_2=0.05$, it would take approximately twenty consecutive recurrences (e.g., days) of a changed behavior of the loads 522A and/or the generators 524A for that behavior to show up in 60% of its strength in the model data 2216.

In some embodiments, a number of the time points of the period of time corresponding to the model data 2216 may be different from a number of the time points of the current period of time corresponding to the current data 2228. In such embodiments, the processor 2212 may be configured to interpolate the current data 2218 to include the same number of time points as the model data 2216 before aggregating the model data 2216 with the current data 2218. Moreover, in some embodiments, the time points corresponding to the model data 2216, the time points corresponding to the current data 2218, or a combination thereof may be spaced at non-uniform time intervals. In some embodiments, the time points of the model data 2216, the current data 2218, or a combination thereof may be uniformly spaced at intervals from anywhere between five (5) minutes to 120 minutes.

The processors 2212 may also, as discussed above, determine a set of control values for a set of control variables to effectuate a change to operation of the electrical power system 500A based, at least in part, on the model data.

FIG. 23 is a simplified flowchart illustrating a method 2300 of operating an electrical power system (e.g., the electrical power system 500A of FIG. 22). Referring to FIGS. 22 and 23 together, the method includes storing 2310 model data 2216 indicating, for time points of a time period of operation of the electrical power system 500A, a model load power for the loads 522A of the electrical power system 500A, a model generator power for the generators 524A of the electrical power system 500A, or a combination of the model load power and the model generator power.

The method 2300 also includes determining 2320, based on information received from the sensors 528A of the electrical power system 500A, current data 2218 including a current load power consumed by the loads 522A of the electrical power system 500A, a current generator power provided by the generators 524A of the electrical power system 500A, or a combination of the current load power and the current generator power for time points of a current time period of operation of the electrical power system. The current time period can correspond to the time period of the model data 2216. By way of non-limiting example, the current time period may be a current day.

The method 2300 further includes updating 2330 the model data 2216 by modifying (e.g., updating) the model data 2216 with the current data 2218. In some embodiments, updating the model data 2216 includes determining a weighted average between the model data 2216 and the current data 2218 (e.g., using an IIR filter). In some embodiments, determining a weighted average between the model data 2216 and the current data 2218 includes weighing the model data 2216 more heavily than the current data 2218 in the weighted average.

The method 2300 also includes determining 2340 a set of control values (e.g., for a set of control variables) to effectuate a change to operation of the electrical power system 500A based, at least in part, on the model data 2216, as discussed above.

Referring once again to FIG. 22, the model data 2216 may be used to predict behavior of the loads 522A, the generators 524A, or a combination thereof. An example of a method 700 for predicting this behavior is discussed above with reference to FIG. 7. For example, before current data 2218 for the entire period of time corresponding to the model data 2216 has been recorded, future data predicted for the current data may be generated using the method 700 of FIG. 7. For example, the processor 2312 may be configured to determine, based on information received from the sensors 528A, the current data 2218 for time points of the current time period corresponding to an early portion of the time period of the model data 2216. The processor 2212 may also be configured to fit the early portion of the model data 2216 to the current data to produce predicted data. A future portion of the predicted data corresponds to time points occurring in the future with reference to the current data 2218. The processor 2212 may further be configured to determine a set of control values (e.g., for a set of control variables) to effectuate a change to operation of the electrical power system based, at least in part, on the future portion of the predicted data.

In practice, the prediction of the future portion of the predicted data may share some similarities with applying a Kalman filter. For example, the prediction takes into account both model data 2216 and innovations in the form of the current data 2218. The prediction may also involve weighting of the model data 2216 and the current data 2218 in updating the model data 2216, and weighted regressions that favor more recent samples or older samples of the current data 2218. As a result, behavior of the predictions may be somewhat similar to what may be observed if the predictions instead were made using a Kalman filter. The processor 2212, however, may perform the predictions without using a linearized model in the form of $x(k+1)=A*x(k)+B*u$, as is used in Kalman filter implementations. Rather, the processor 2212 may instead use a table of historic average values that represents the model data 2218, which may be an evolution of load power and/or generator power that may not be expressed in linear equation form.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A controller of an electrical power system, the controller comprising a data storage device and one or more processors. The data storage device is to store historic load data for one or more loads of the electrical power system, and to store a minimum state of charge for a battery associated with the electrical power system. The one or more processors operably are coupled to the data storage device and configured to predict a net power consumption during a future time period of the electrical power system based on the historic load data. The one or more processors are to also determine a demand setpoint that limits peak energy consumption of the electrical power system during the future time period and maintains a battery state of charge above the minimum state of charge during the future time period. The demand setpoint is determined by performing one or more simulations of operation of the electrical power system for the future time period, each of the one or more simulations applying a candidate demand setpoint value to a model of the electrical power system that includes the predicted net power consumption. The one or more processors are to also provide at least one control value to the electrical power system to effectuate a change to the electrical power system to comply with the demand setpoint.

Example 2

The controller of Example 1, wherein to predict the net power consumption, the one or more processors scale and offset the historic load data based on current load data.

Example 3

The controller of Example 1, wherein the minimum state of charge is a function of a demand rate associated with the future time period.

Example 4

The controller of Example 1, wherein the one or more processors perform the one or more simulations in parallel.

Example 5

The controller of Example 1, wherein the one or more processors iteratively perform the one or more simulations.

Example 6

The controller of Example 1, wherein the one or more processors iteratively perform the one or more simulations with a plurality of candidate demand setpoint values that increase with each simulation until a minimum demand setpoint is found that maintains the battery state of charge above the minimum state of charge during the future time period.

Example 7

The controller of Example 6, wherein a lowest candidate demand setpoint value of the plurality of candidate demand setpoint values is based on a previous demand setpoint used during a past period of time.

Example 8

The controller of Example 6, wherein a lowest candidate value demand setpoint of the plurality of candidate demand setpoint values is zero.

Example 9

The controller of Example 1, wherein the one or more processors are further configured to determine whether the future time period is a demand window, and set the candidate demand setpoint value based on a determination that the future time period is a demand window.

Example 10

The controller of Example 9, wherein, if the future time period is not a demand window, the demand setpoint value is determined to be set to a high value to allow the battery to charge.

Example 11

The controller of Example 9, wherein the one or more processors determine whether the future time period is a demand window based on at least one of a predetermined time, an algorithm, and a schedule.

Example 12

The controller of Example 9, wherein different demand setpoints are determined for overlapping demand windows.

Example 13

The controller of Example 9, wherein a single demand setpoint is determined for overlapping demand windows.

Example 14

The controller of Example 1, wherein the one or more processors is further configured to fit the historic load data to current load data by performing a regression analysis to determine a scale and offset of the historic data to minimize an error between the historic data and the current data.

Example 15

The controller of Example 1, wherein the at least one control value comprises the demand setpoint.

Example 16

The controller of Example 1, wherein the at least one control value is determined based on the demand setpoint.

Example 17

The controller of Example 1, wherein performing one or more simulations of operation of the electrical power system includes utilizing initialization information comprising a present configuration of the electrical power system and an initial demand setpoint to be applied as a first candidate demand set point value in an initial simulation of the one or more simulations, wherein the present configuration includes one or more constraints of the electrical system.

Example 18

The controller of Example 1, wherein the one or more processors are further configured to discretize the future time period into a plurality of intervals and to perform the one or more simulations for the plurality of intervals to determine a demand setpoint for each interval of the plurality of intervals of the future time period.

Example 19

The controller of Example 18, wherein a configuration of the model of the electrical power system at each interval is based on an output of a previous interval simulation.

Example 20

An electrical power control system, comprising one or more sensors, a data storage device, and a multi-mode controller. The one or more sensors operably coupled to an energy storage system and one or more loads of an electrical power system. The one or more sensors to measure power for the one or more loads. The data storage device to store historic load data for the one or more loads and a minimum state of charge for a battery of the energy storage system. The multi-mode controller operably coupled to the one or more sensors and the energy storage system. The multi-mode controller configured to update a demand setpoint based on a current operating mode. If the current operating mode is a demand control mode, the multi-mode controller predicts a net power consumption of the one or more loads during a demand reduction period, based on the historic load data. The multi-mode controller also performs one or more simulations of operation of the electrical power control system during the demand reduction period. The multi-mode controller also determines, based on the one or more simulations, a demand setpoint that limits peak energy consumption of the one or more loads during the demand reduction period and that maintains a state of charge of the battery above the minimum state of charge during the demand reduction period. The multi-mode controller also provides at least one control value to the electrical power system to effectuate a change to the electrical power system to comply with the demand setpoint.

Example 21

The electrical power control system of Example 20, wherein if the current operating mode is a charge control mode, the multi-mode controller updates the demand setpoint to a high value to allow the battery to charge (e.g., to allow the electrical power system to charge the battery).

Example 22

The electrical power control system of Example 20, wherein the multi-mode controller is further configured to determine whether the current operating mode is the demand control mode or a charge control mode.

Example 23

The electrical power control system of Example 22, wherein the multi-mode controller determines the current operating mode based on at least one of a predetermined time, an algorithm, and a schedule.

Example 24

The electrical power control system of Example 20, wherein the multi-mode controller comprises a demand setpoint resolver to determine the at least one control value to provide to the electrical power system, based on the demand setpoint.

Example 25

The electrical power system of Example 20, wherein the multimode control provides to the electrical power system a set of control values for a set of control variables to effectuate a change to the electrical storage system and loads toward demand reduction during the demand reduction period, wherein the set of control values includes the demand setpoint.

Example 26

The electrical power system of Example 20, wherein to predict the net power consumption, the multi-mode controller scales and offsets the historic load data based on a current load data.

Example 27

The electrical power system of Example 20, wherein the minimum state of charge of the battery is a function of a demand rate associated with a future time period.

Example 28

The electrical power system of Example 20, wherein the multimode controller iteratively performs the one or more simulations with a plurality of candidate demand setpoint values that increase with each simulation until a minimum demand setpoint is found that maintains the battery state of charge above the minimum state of charge during the future time period.

Example 29

The electrical power system of Example 20, wherein the at least one control value comprises the demand setpoint.

Example 30

A method of operating an electrical power system, the method comprising: identifying a demand window; predicting a net power consumption of the electrical power system during the demand window based on historic load data; simulating operation of the electrical power system during the demand window using the predicted net power consumption; determining, based on the simulating, a demand setpoint to both reduce peak energy consumption during the demand window and maintain a battery of the electrical power system at a state of charge above a recommended minimum state of charge during the demand window; and providing a set of one or more control values to the electrical power system to effectuate a change to the electrical power system to comply with the demand setpoint.

Example 31

The method of Example 30, wherein the control value instructs the electrical power system to charge the battery during the demand window when actual energy consumption is below the demand setpoint.

Example 32

The method of Example 30, wherein different demand setpoints are determined for overlapping demand windows.

Example 33

The method of Example 30, wherein a single demand setpoint is determined for overlapping demand windows.

Example 34

The method of Example 30, wherein predicting the net power consumption comprises scaling and offsetting the historic load data based on current load data.

Example 35

The method of Example 30, wherein the recommended minimum state of charge is a function of a demand rate associated with the future time period.

Example 36

The method of Example 30, wherein identifying the demand window is based on at least one of a predetermined time, an algorithm, and a schedule.

Example 37

The method of Example 30, wherein the set of or more control values comprises the demand setpoint.

Example 38

The method of Example 30, wherein the set of or more control values is at least partially determined based on the demand setpoint.

Example 39

The method of Example 30, where in the simulating operation of the electrical power system includes one or more simulations and for each simulation of the one or more simulations applying a candidate demand setpoint value to a model of the electrical power system that includes the predicted net power consumption.

Example 40

A method of operating an electrical power system, the method comprising: discretizing a future time period into a plurality of intervals; predicting a net power consumption of the electrical power system during the future time period based on historic load data; simulating operation of the electrical power system during each of the plurality of time intervals of the demand window using the predicted net power consumption; determining a demand setpoint for each of the plurality of intervals, based on the simulating, the demand setpoint determined so as to both reduce peak energy consumption during the demand window and maintain a battery of the electrical power system at a state of charge above a recommended minimum state of charge during the demand window; and providing a set of one or more control values to the electrical power system to effectuate a change to the electrical power system to comply with the demand setpoint.

Example 41

The method of Example 40, where in the simulating operation of the electrical power system includes applying a candidate demand setpoint value to a model of the electrical power system that includes the predicted net power consumption.

Example 42

The method of Example 40, wherein a configuration of the model of the electrical power system at each interval is based on an output of a previous interval simulation.

Example 43

A controller of an electrical system, the controller comprising a storage device, a communication interface, and one or more processors. The storage device is to store historic load data for the electrical power system and a minimum state of charge for a battery of the electrical power system. The communication interface is to connect to a communication path to the electrical power system and/or one or more sensors are operably coupled to the electrical power system. The one or more processors are operably coupled to the storage device and are configured to predict a net power consumption of the electrical power system during a future time period. The one or more processors also are to perform one or more simulations of operation of the electrical system during the future time period, each of the one or more simulations modeling operation of the electrical power system based on the predicted net power consumption during the future time period. The one or more processors also are to determine, based on the one or more simulations, a value for a demand setpoint that limits peak energy consumption of the electrical power system during the future time period and that maintains the battery at a state of charge above the minimum state of charge during the future time period. The one or more processors also are to provide a set of one or more control values to the electrical power system to effectuate a change to the electrical power system to comply with the demand setpoint.

Example 44

The controller of claim 43, wherein each of the one or more simulations apply an iteration of a candidate value of the demand setpoint.

Example 45

The controller of claim 43, wherein the minimum state of charge is a variable function based on.

Example 46

The controller of claim 43, wherein the minimum state of charge is a constant prescribed by a manufacturer of the battery.

Example 47

The controller of claim 43, wherein the set of one or more control values includes the demand setpoint.

Example 48

The controller of claim 43, wherein the set of one or more control values is determined based on the demand setpoint.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A controller of an electrical power system, the controller comprising:
 a data storage device to store historic load data for one or more loads of the electrical power system, and to store a minimum state of charge for a battery associated with the electrical power system; and
 one or more processors operably coupled to the data storage device and configured to:
  predict a net power consumption during a future time period of the electrical power system based on the historic load data;
  determine a demand setpoint that limits peak energy consumption of the electrical power system during the future time period and maintains a battery state of charge above the minimum state of charge during the future time period, wherein the demand setpoint is determined by performing one or more simulations of operation of the electrical power system for the future time period, each of the one or more simulations applying a candidate demand setpoint value to a model of the electrical power system that includes the predicted net power consumption,
  wherein the one or more processors iteratively perform the one or more simulations with a plurality of candidate demand setpoint values that increase with each simulation until a minimum demand setpoint is found that maintains the battery state of charge above the minimum state of charge during the future time period,
  wherein a lowest candidate demand setpoint value of the plurality of candidate demand setpoint values is based on a previous demand setpoint used during a past period of time; and
  provide at least one control value to the electrical power system to effectuate a change to the electrical power system to comply with the demand setpoint.

2. The controller of claim 1, wherein to predict the net power consumption, the one or more processors scale and offset the historic load data based on current load data.

3. The controller of claim 1, wherein the minimum state of charge is a function of a demand rate associated with the future time period.

4. The controller of claim 1, wherein the one or more processers perform the one or more simulations in parallel.

5. The controller of claim 1, wherein the one or more processors are further configured to determine whether the future time period is a demand window, and set the candidate demand setpoint value based on a determination that the future time period is a demand window.

6. The controller of claim 5, wherein, if the future time period is not a demand window, the candidate demand setpoint value is determined to be set to a high value to allow the battery to charge.

7. The controller of claim 5, wherein different demand setpoints are determined for overlapping demand windows.

8. The controller of claim 7, wherein the one or more processors are further configured to discretize the future time period into a plurality of intervals and to perform the one or more simulations for the plurality of intervals to determine a demand setpoint for each interval of the plurality of intervals of the future time period.

9. The controller of claim 1, wherein the one or more processors is further configured to fit the historic load data to current load data by performing a regression analysis to determine a scale and offset of the historic load data to minimize an error between the historic load data and the current load data.

10. The controller of claim 1, wherein the at least one control value comprises the demand setpoint.

11. The controller of claim 1, wherein the at least one control value is determined based on the demand setpoint.

12. The controller of claim 1, wherein performing the one or more simulations of operation of the electrical power system includes utilizing initialization information comprising a present configuration of the electrical power system and an initial demand setpoint to be applied as a first candidate demand set point value in an initial simulation of the one or more simulations, wherein the present configuration includes one or more constraints of the electrical power system.

13. An electrical power control system, comprising:
 one or more sensors operably coupled to an energy storage system and one or more loads of an electrical power system, the one or more sensors configured to measure power for the one or more loads;

a data storage device configured to store historic load data for the one or more loads and a minimum state of charge for a battery of the energy storage system; and a multi-mode controller operably coupled to the one or more sensors and the energy storage system, the multi-mode controller configured to update a demand setpoint based on a current operating mode, wherein if the current operating mode is a demand control mode, the multi-mode controller:

predicts a net power consumption of the one or more loads during a demand reduction period, based on the historic load data;

performs one or more simulations of operation of the electrical power control system during the demand reduction period;

determines, based on the one or more simulations, a demand setpoint that limits peak energy consumption of the one or more loads during the demand reduction period and that maintains a state of charge of the battery above the minimum state of charge during the demand reduction period, wherein the multi-mode controller iteratively performs the one or more simulations with a plurality of candidate demand setpoint values that increase with each simulation until a minimum demand setpoint is found that maintains the battery state of charge above the minimum state of charge during the future time period, wherein a lowest candidate demand setpoint value of the plurality of candidate demand setpoint values is any value lower than a lowest possible adjusted net power during the demand reduction period; and provides at least one control value to the electrical power system to effectuate a change to the electrical power system to comply with the demand setpoint.

14. The electrical power control system of claim 13, wherein if the current operating mode is a charge control mode, the multi-mode controller updates the demand setpoint to a high value to allow the battery to charge.

15. The electrical power control system of claim 13, wherein the multi-mode controller is further configured to determine whether the current operating mode is the demand control mode or a charge control mode.

16. The electrical power control system of claim 15, wherein the multi-mode controller determines the current operating mode based on at least one of a predetermined time, an algorithm, and a schedule.

17. The electrical power control system of claim 13, wherein the multi-mode controller comprises a demand setpoint resolver to determine the at least one control value to provide to the electrical power system, based on the demand setpoint.

18. The electrical power control system of claim 13, wherein the multi-mode control provides to the electrical power system a set of control values for a set of control variables to effectuate a change to the energy storage system and loads toward demand reduction during the demand reduction period, wherein the set of control values includes the demand setpoint.

19. The electrical power control system of claim 13, wherein to predict the net power consumption, the multi-mode controller scales and offsets the historic load data based on a current load data.

20. The electrical power control system of claim 13, wherein the minimum state of charge of the battery is a function of a demand rate associated with a future time period.

21. The electrical power control system of claim 13, wherein the multi-mode controller iteratively performs the one or more simulations with a plurality of candidate demand setpoint values that increase with each simulation until a minimum demand setpoint is found that maintains the battery state of charge above the minimum state of charge during a future time period.

22. The electrical power control system of claim 13, wherein the at least one control value comprises the demand setpoint.

23. The electrical power control system of claim 13, wherein the lowest candidate demand setpoint value of the plurality of candidate demand setpoint values is zero.

24. A method for control of an electrical system, the method comprising:

predicting a net power consumption during a future time period of the electrical power system based on the historic load data;

determining a demand setpoint that limits peak energy consumption of the electrical power system during the future time period and maintains a battery state of charge above the minimum state of charge during the future time period, wherein the demand setpoint is determined by performing one or more simulations of operation of the electrical power system for the future time period, each of the one or more simulations applying a candidate demand setpoint value to a model of the electrical power system that includes the predicted net power consumption, wherein the one or more simulations are iteratively performed with a plurality of candidate demand setpoint values that increase with each simulation until a minimum demand setpoint is found that maintains the battery state of charge above the minimum state of charge during the future time period, wherein a lowest candidate demand setpoint value of the plurality of candidate demand setpoint values is based on a previous demand setpoint used during a past period of time; and providing at least one control value to the electrical power system to effectuate a change to the electrical power system to comply with the demand setpoint.

25. The method of claim 24, wherein to predicting the net power consumption comprises scaling and offsetting the historic load data based on current load data.

26. The method of claim 24, wherein the minimum state of charge is a function of a demand rate associated with the future time period.

27. The method of claim 24, further comprising:

determining whether the future time period is a demand window, and setting the candidate demand setpoint value based on a determination that the future time period is a demand window, wherein, if the future time period is not a demand window, the candidate demand setpoint value is set to a high value to allow the battery to charge.

28. The method of claim 24, further comprising fitting the historic load data to current load data by performing a regression analysis to determine a scale and offset of the historic load data to minimize an error between the historic load data and the current load data.

29. A method for control of an electrical system, the method comprising:
- predicting a net power consumption during a future time period of the electrical power system based on the historic load data;
- determining a demand setpoint that limits peak energy consumption of the electrical power system during the future time period and maintains a battery state of charge above the minimum state of charge during the future time period, wherein the demand setpoint is determined by performing one or more simulations of operation of the electrical power system for the future time period, each of the one or more simulations applying a candidate demand setpoint value to a model of the electrical power system that includes the predicted net power consumption,
- wherein the one or more simulations are iteratively performed with a plurality of candidate demand setpoint values that increase with each simulation until a minimum demand setpoint is found that maintains the battery state of charge above the minimum state of charge during the future time period,
- wherein a lowest candidate demand setpoint value of the plurality of candidate demand setpoint values is any value lower than a lowest possible adjusted net power during the demand reduction period; and
- providing at least one control value to the electrical power system to effectuate a change to the electrical power system to comply with the demand setpoint.

30. The method of claim 29, wherein to predicting the net power consumption comprises scaling and offsetting the historic load data based on current load data.

* * * * *